United States Patent
Iwata et al.

(10) Patent No.: US 11,285,387 B2
(45) Date of Patent: Mar. 29, 2022

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Kenji Iwata, Kyoto (JP); Yuta Ogura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 60 days.

(21) Appl. No.: 16/798,671

(22) Filed: Feb. 24, 2020

(65) Prior Publication Data

US 2020/0276500 A1 Sep. 3, 2020

(30) Foreign Application Priority Data

Mar. 1, 2019 (JP) .............................. JP2019-037455

(51) Int. Cl.
| A63F 13/428 | (2014.01) |
| A63F 13/211 | (2014.01) |
| A63F 13/212 | (2014.01) |
| A63F 13/5255 | (2014.01) |

(52) U.S. Cl.
CPC .......... *A63F 13/428* (2014.09); *A63F 13/211* (2014.09); *A63F 13/212* (2014.09); *A63F 13/5255* (2014.09); *A63F 2300/105* (2013.01); *A63F 2300/6045* (2013.01); *A63F 2300/6676* (2013.01)

(58) Field of Classification Search
CPC .... A63F 13/211; A63F 13/212; A63F 13/428; A63F 13/5255; A63F 13/42; A63F 13/525; A63F 2300/105; A63F 2300/6045; A63F 2300/6676; A63F 2300/6661

See application file for complete search history.

(56) References Cited

U.S. PATENT DOCUMENTS

| 10,895,952 | B2* | 1/2021 | Hong | G06F 3/04815 |
| 2005/0285339 | A1* | 12/2005 | Park | A63F 3/00214 273/260 |
| 2006/0116202 | A1* | 6/2006 | Nakajima | A63F 13/56 463/30 |
| 2006/0197281 | A1* | 9/2006 | Waid | A63F 3/00006 273/242 |
| 2008/0125224 | A1* | 5/2008 | Pollatsek | A63F 13/211 463/36 |
| 2008/0136100 | A1* | 6/2008 | Jorgensen | A63F 3/00214 273/241 |
| 2012/0218298 | A1* | 8/2012 | Hayakawa | A63F 13/42 345/633 |

(Continued)

FOREIGN PATENT DOCUMENTS

JP 2016-189194 11/2016

*Primary Examiner* — Seng H Lim
(74) *Attorney, Agent, or Firm* — Nixon & Vanderhye, PC

(57) ABSTRACT

A plurality of objects are placed at respective positions in a three-dimensional virtual space, and for each of the plurality of objects, a movable surface including at least a first surface and a second surface at a predetermined angle to the first surface in a portion where the second surface intersects the first surface is defined. Then, based on a user input, the object is moved along the movable surface defined for the object.

20 Claims, 18 Drawing Sheets

(56) References Cited

U.S. PATENT DOCUMENTS

| | | | |
|---|---|---|---|
| 2012/0218299 A1* | 8/2012 | Hayakawa | A63F 13/655 345/633 |
| 2012/0249741 A1* | 10/2012 | Maciocci | G06T 15/503 348/46 |
| 2013/0035612 A1* | 2/2013 | Mason | A61B 5/1124 600/595 |
| 2016/0239080 A1* | 8/2016 | Marcolina | G06F 1/163 |
| 2018/0364885 A1* | 12/2018 | Melencio | G06F 3/015 |
| 2019/0250791 A1* | 8/2019 | Hong | G06F 3/04815 |
| 2021/0097776 A1* | 4/2021 | Faulkner | G06F 1/1686 |

\* cited by examiner

F I G. 1
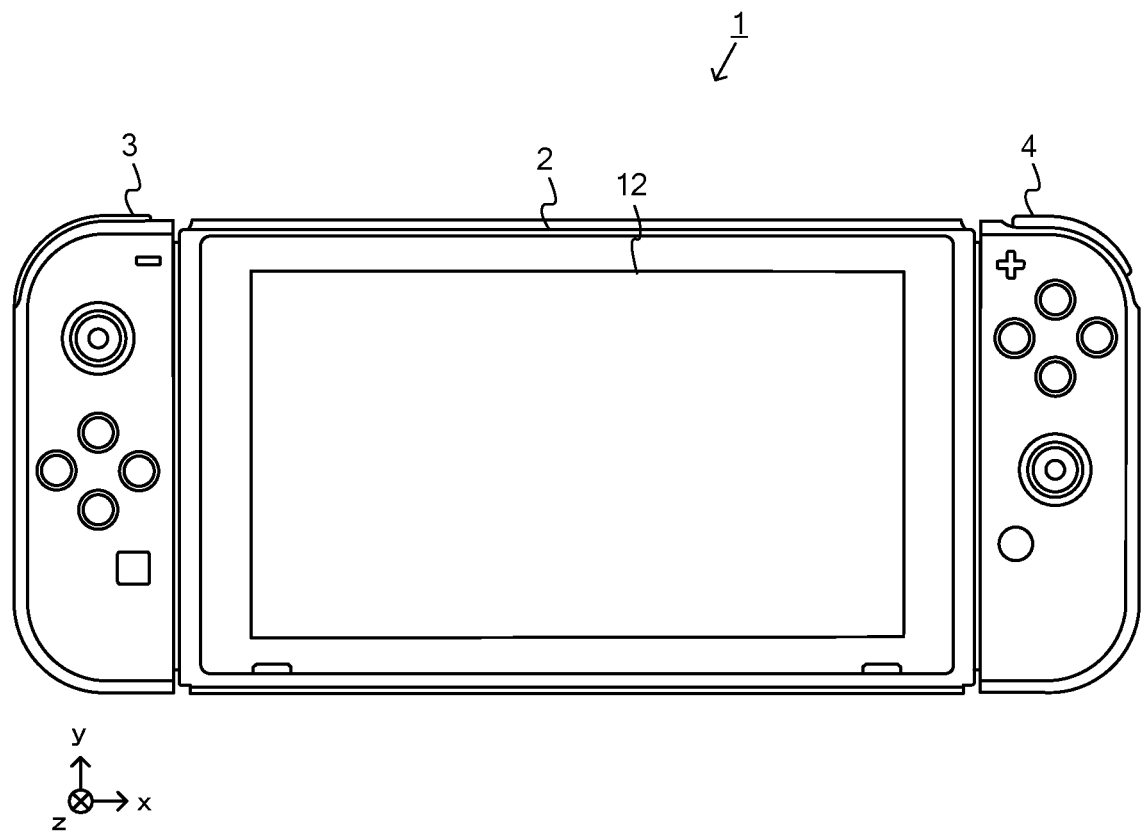

F I G. 1 4
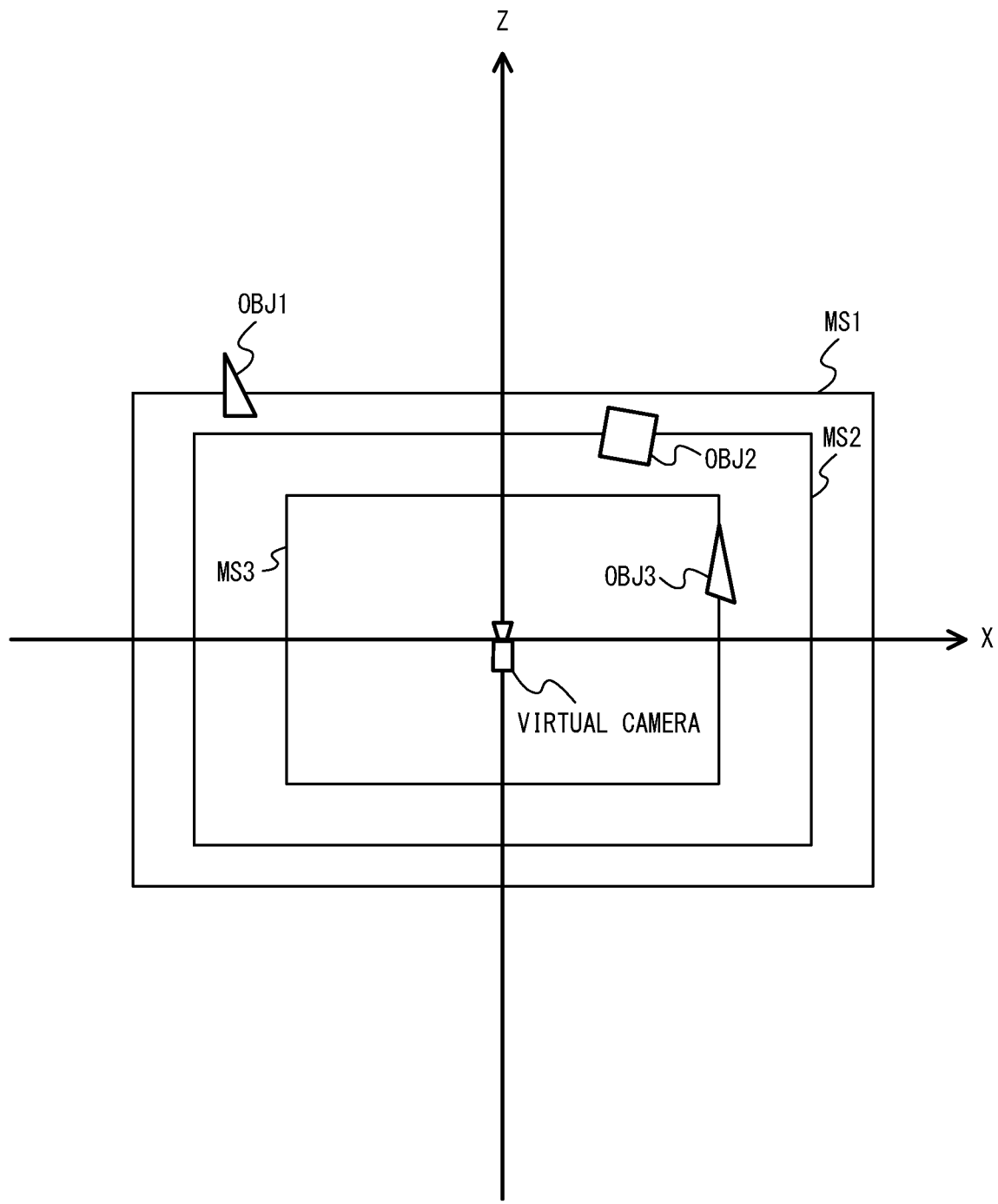

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2019-37455, filed on Mar. 1, 2019, is incorporated herein by reference.

FIELD

The technology shown here relates to a storage medium having stored therein an information processing program, an information processing apparatus, an information processing system, and an information processing method for performing the process of moving an object in a virtual space.

BACKGROUND AND SUMMARY

Conventionally, there is a display device for moving an object in a virtual space in accordance with an operation of a user.

In the display device, however, there is room for improvement in moving and placing an object in a virtual space as intended by a user.

Therefore, it is an object of an exemplary embodiment to provide an information processing program, an information processing apparatus, an information processing system, and an information processing method that are capable of moving and placing an object in a virtual space as intended by a user.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein an information processing program according to an exemplary embodiment, a non-transitory computer-readable storage medium has stored therein an information processing program executed by a computer of an information processing apparatus for placing or moving an object in a three-dimensional virtual space. The information processing program causes the computer to execute: placing a plurality of objects at respective positions in the three-dimensional virtual space; for each of the plurality of objects, defining a movable surface including at least a first surface in the three-dimensional virtual space and a second surface at a predetermined angle to the first surface in a portion where the second surface intersects the first surface; and based on a first user input, moving the object along the movable surface defined for the object.

Based on the above, when an object is moved in a virtual space, the object can be moved along a movable surface including a plurality of component surfaces at a predetermined angle to each other in a portion where the component surfaces intersect each other. Thus, it is possible to move and place the object in the virtual space as intended by a user.

Further, the information processing program may further cause the computer to execute placing a virtual camera for acquiring an image of the three-dimensional virtual space in the three-dimensional virtual space, and controlling the virtual camera. In this case, the movable surface may be defined around the virtual camera in the three-dimensional virtual space.

Based on the above, the movable surface is defined around a virtual camera. Thus, it is possible to move and place the object to the periphery of the viewpoint of the virtual camera.

Further, the movable surface may be defined based on a position of the object.

Based on the above, the movable surface is defined based on the position of the object. Thus, it is possible to set an appropriate movable surface corresponding to the position of the object.

Further, even when an orientation of the virtual camera is changed in the three-dimensional virtual space, the movable surface may be defined by fixing a position of the movable surface.

Based on the above, the object can be moved along the movable surface fixed in the virtual space. Thus, it is possible to prevent a positional shift corresponding to the motion of a virtual camera or the like.

Further, a plurality of movable surfaces placed in a laminated manner may be defined. Based on a second user input, the object may be moved from a movable surface of the object including a position of the object among the plurality of movable surfaces to a movable surface different from the movable surface among the plurality of movable surfaces.

Based on the above, it is also possible to move the object using another movable surface. Thus, it is possible to move the object in various manners.

Further, based on a second user input, the object may be moved to a position other than the movable surface defined in association with the object. When the object moves based on the second user input, the movable surface of the object may be defined based on the position of the object after the movement.

Based on the above, it is also possible to move the object using a newly defined movable surface. Thus, it is possible to move the object in various manners.

Further, the object may be moved to and from the first surface and the second surface through a position where the first surface and the second surface intersect each other.

Based on the above, it is possible to switch to the movement of the object along another surface without changing an operation method.

Further, when the object shifts from a movement along the first surface to a movement along the second surface, the object may be moved while an orientation of the object is held in the three-dimensional virtual space.

Based on the above, even when the moving direction of the object changes, the orientation of the object does not change. Thus, this method is suitable for a case where the object moves without changing the orientation of the object.

Further, the information processing program may further cause the computer to execute acquiring an orientation of a goggle apparatus attached to a position where the goggle apparatus covers at least an eye of a user and including a display screen configured to display an image of the three-dimensional virtual space viewed from the virtual camera so that the user can view the image. In this case, the virtual camera may be controlled based on the orientation of the goggle apparatus.

Based on the above, a stereoscopically viewable image can be provided to a user who views a display screen by wearing a goggle apparatus. Thus, it is possible to change a display area in accordance with the motion of the user wearing the goggle.

Further, the information processing program may further cause the computer to execute: displaying on a display device an image of the three-dimensional virtual space viewed from the virtual camera; and acquiring an orientation of the display device. In this case, the virtual camera may be controlled based on the orientation of the display device.

Based on the above, a display range can be changed in accordance with the orientation of a display device for displaying a virtual space image. Thus, it is possible to provide a realistic image as if peeping at the virtual space through the display device.

Further, the object may be moved based on an angular velocity included in the first user input.

Based on the above, it is possible to perform the operation of moving the object based on an angular velocity.

Further, each of the first surface and the second surface may be a flat surface.

Based on the above, it is possible to move the object along flat surfaces at different angles.

Further, the first surface and the second surface may orthogonally intersect each other in the portion where the first surface and the second surface intersect each other.

Based on the above, it is easy to place objects by aligning the objects based on front, back, left, and right directions in the virtual space.

Further, among a plurality of surfaces forming the movable surface, a surface including a position of the object to be moved based on the first user input may be displayed in a display form different from a display form of another surface.

Based on the above, it is possible to easily grasp a reference for the movement of the object that is moved.

The exemplary embodiment may be carried out in the forms of an information processing apparatus, an information processing system, and an information processing method.

Further, the information processing apparatus may be able to communicate with an operation device. The operation device may include a gyro sensor configured to detect an angular velocity generated in the operation device. In this case, the object may be moved using as the first user input the angular velocity detected by the gyro sensor.

Based on the above, it is possible to perform the operation of moving an object to the position to which an operation device is moved.

According to the exemplary embodiment, when an object is moved in a virtual space, the object can be moved along a movable surface including a plurality of component surfaces at a predetermined angle to each other in a portion where the component surfaces intersect each other. Thus, it is possible to move and place the object in the virtual space as intended by a user.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a diagram showing a non-limiting example of the state where a left controller 3 and a right controller 4 are attached to a main body apparatus 2 in an example of a game system 1 according to an exemplary embodiment;

FIG. 14 is a diagram showing non-limiting examples of movable surfaces MS1 to MS3 set for a plurality of objects OBJ1 to OBJ3, respectively;

DETAILED DESCRIPTION OF NON-LIMITING EXAMPLE EMBODIMENTS

Figure 2:
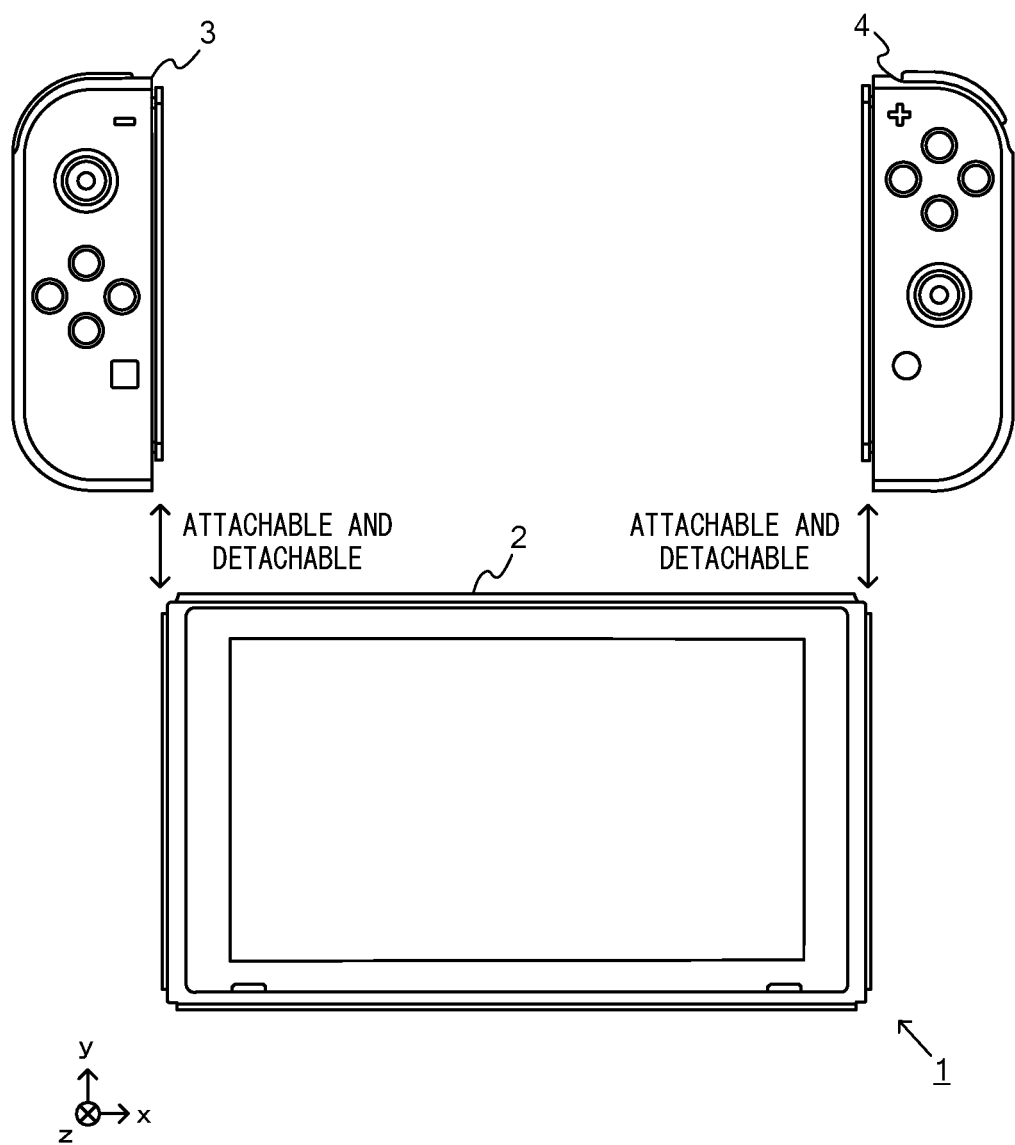
FIG. 2 is a diagram showing a non-limiting example of the state where each of the left controller 3 and the right controller 4 is detached from the main body apparatus 2.

An information processing system according to an exemplary embodiment is described below. As the information processing system according to the exemplary embodiment, as an example, a game system 1 is used. The game system 1 includes a main body apparatus (an information processing apparatus; which functions as a game apparatus main body in the exemplary embodiment) 2, and a left controller 3 and a right controller 4 as examples of an operation device. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
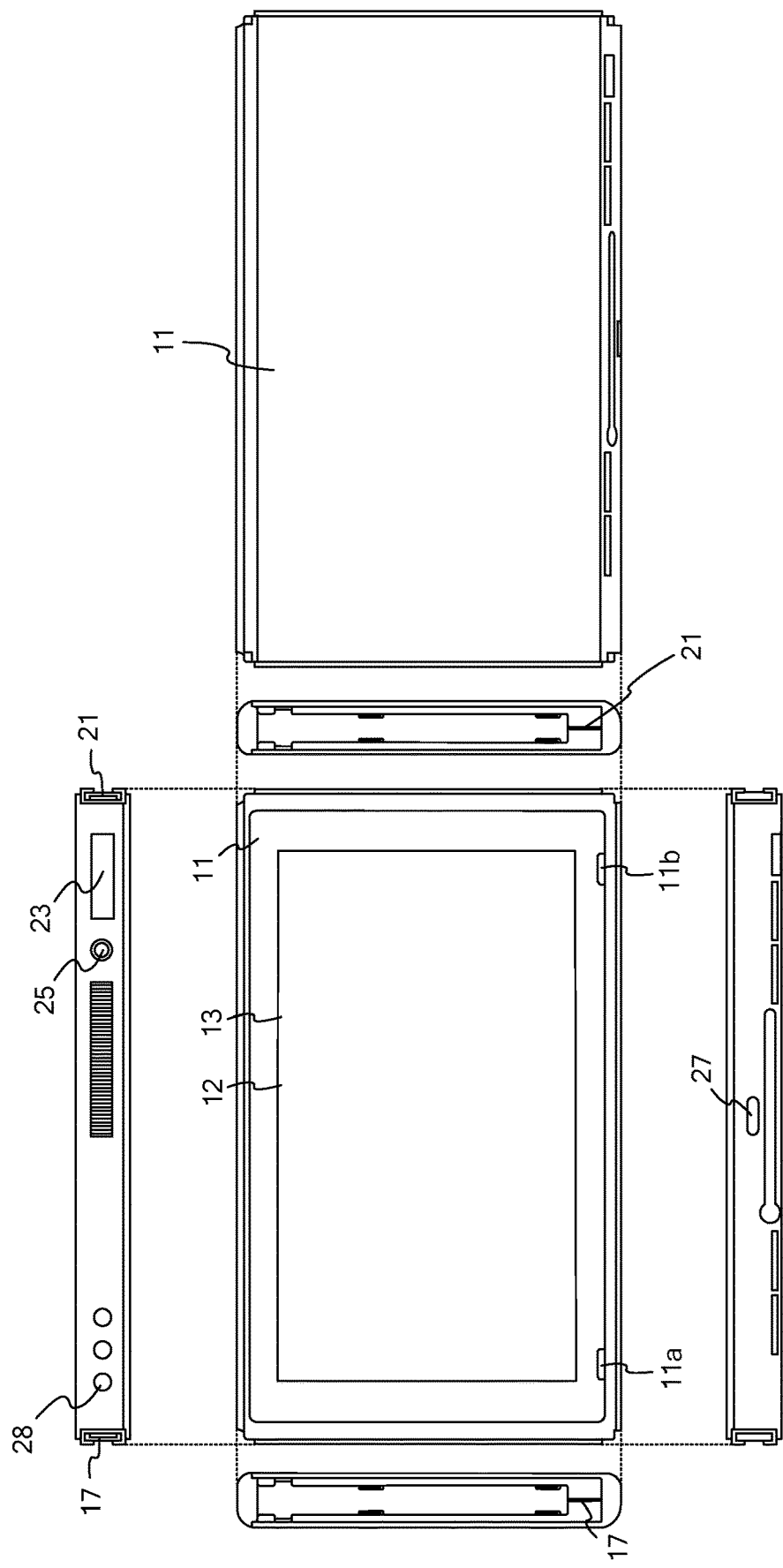
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

The main body apparatus 2 includes an illuminance sensor 29. In the exemplary embodiment, the illuminance sensor 29 is provided in a lower portion of the main surface of the housing 11 and detects the illuminance (brightness) of light incident on the main surface side of the housing 11. It should be noted that an image can be displayed by setting the display 12 to an appropriate brightness in accordance with the illuminance of the light detected by the illuminance sensor 29. In the exemplary embodiment, based on the detected illuminance, it can be determined whether or not the main body apparatus 2 is attached to a goggle apparatus described below.

Figure 4:
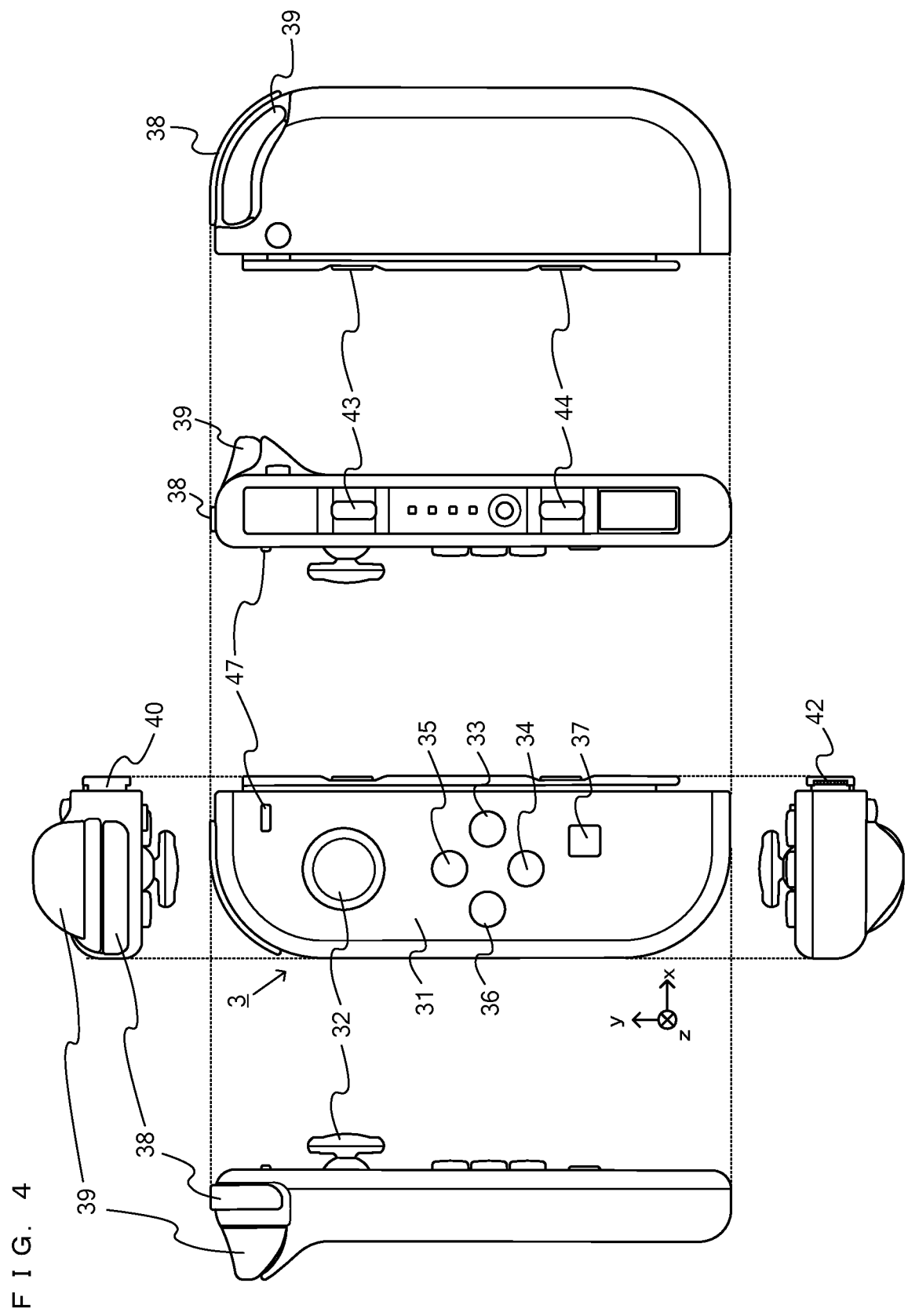
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
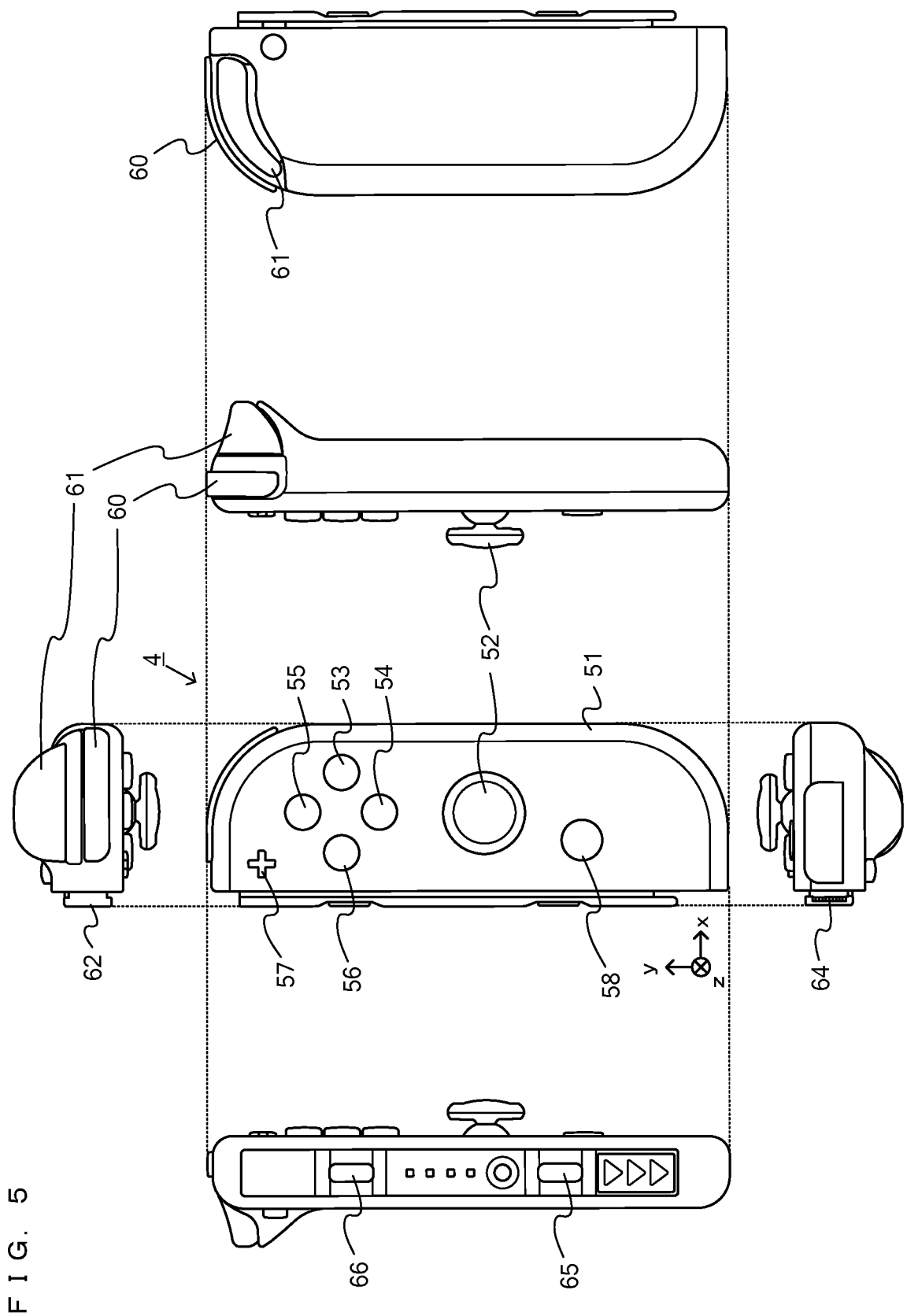
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
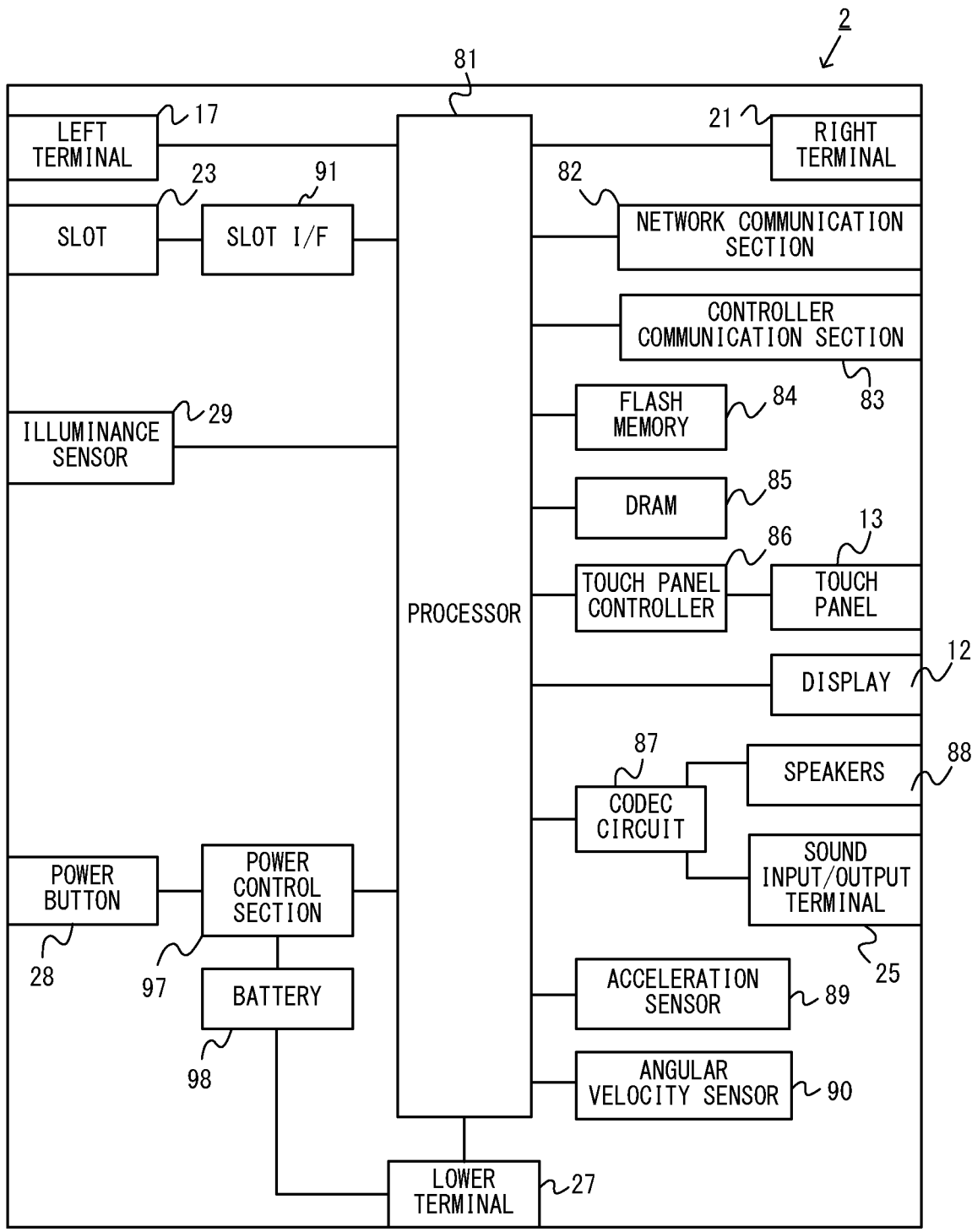
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The illuminance sensor 29 is connected to the processor 81, and the detection result of the illuminance sensor 29 is output to the processor 81. Based on the detection result of the illuminance sensor 29, the processor 81 can calculate information regarding the brightness of the periphery of the main body apparatus 2. As an example, when the main body apparatus 2 is attached to a goggle apparatus described below, the brightness of the periphery of the main body apparatus 2 decreases. Thus, based on the detection result of the illuminance sensor 29, the processor 81 can determine whether or not the main body apparatus 2 is attached to the goggle apparatus.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
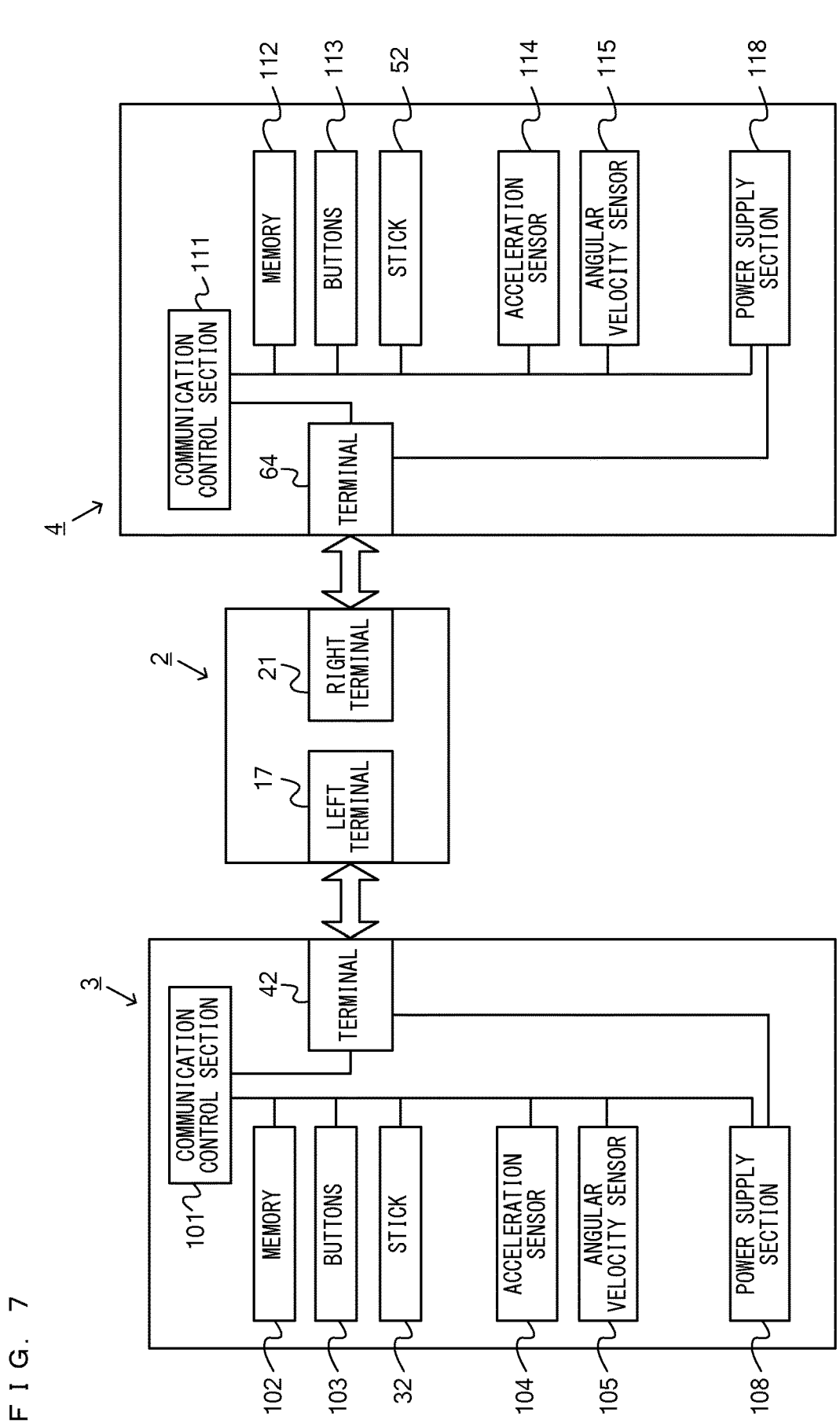
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. A description is given below using a game system in a use form in which an image is output from the main body apparatus 2 in the state where the left controller 3 and the right controller 4 are detached from the main body apparatus 2. As a form in a case where an operation is performed on an application (e.g., an editor for generating and editing a virtual space, or a game application) using the game system 1 in the state where the left controller 3 and the right controller 4 are detached from the main body apparatus 2, a form is possible in which a single user uses the main body apparatus 2 and the left controller 3 or the right controller 4.

Figure 8:
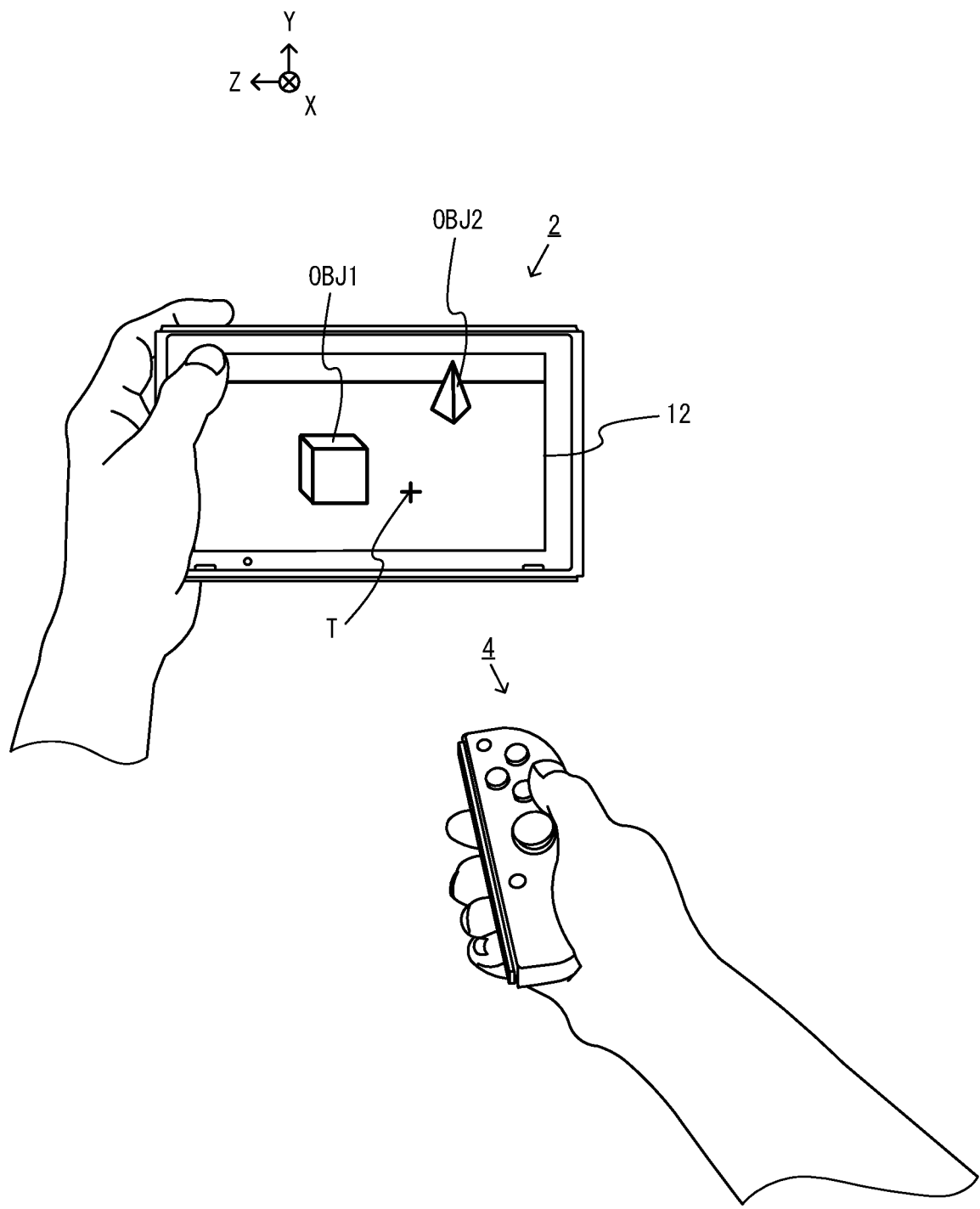
FIG. 8 is a diagram showing a non-limiting example of the state where a single user uses the game system 1 by operating the main body apparatus 2 and the right controller 4 in the state where the left controller 3 and the right controller 4 are detached from the main body apparatus 2.

FIG. 8 is a diagram showing examples of the state where in the state where the left controller 3 and the right controller 4 are detached from the main body apparatus 2, a single user uses the game system 1 by operating the main body apparatus 2 and the right controller 4. As shown in FIG. 8, the user can perform operations while viewing an image displayed on the main body apparatus 2 by holding the main body apparatus 2 with their left hand and holding the right controller 4 with their right hand.

For example, in the exemplary embodiment, the user holds the right controller 4 with one hand (e.g., their right hand) such that the display 12 of the main body apparatus 2 is pointed at by the right controller 4 in the longitudinal direction of the right controller 4 (an up direction shown in FIG. 1 (a positive y-axis direction)), which is vertically long and approximately plate-shaped, and a side surface of the right controller 4 that is in contact with the main body apparatus 2 when the right controller 4 is attached to the main body apparatus 2 (a side surface on which a slider 62 is provided) is directed leftward, and also the main surface of the right controller 4 (a surface on which the analog stick 52 and the like are provided) is directed upward. That is, the right controller 4 held with one hand of the user is in the state where the positive y-axis direction is directed in the forward direction of the user, and a positive z-axis direction is directed upward.

In the exemplary embodiment, the user holds the main body apparatus 2 with the other hand (e.g., their left hand) such that the longitudinal direction of the main body apparatus 2 (an x-axis direction shown in FIG. 1), which is horizontally long and approximately plate-shaped, is horizontal, and the main surface of the main body apparatus 2 (the surface on which the display 12 is provided) is on the user side. The main body apparatus 2 held with the other hand of the user is in the state where a negative z-axis direction is directed to the user side, and the x-axis direction is horizontal.

As described above, in accordance with operations on the operation buttons or the stick of the right controller 4 held with one hand of the user or the operation of moving a main body of the right controller 4, a virtual space is generated and edited, or game play using the virtual space is performed. For example, the acceleration sensor 114 of the right controller 4 can detect accelerations in the xyz axis directions as operation inputs, and the angular velocity sensor 115 can detect angular velocities about the xyz axis directions as operation inputs. The motion or the orientation of the main body of the right controller 4 can be calculated using the accelerations and/or the angular velocities. In the exemplary embodiment, as an example, in accordance with a user operation using the right controller 4, an object placed in the virtual space displayed on the display 12 can be moved.

In the exemplary embodiment, in accordance with the operation of moving the main body of the main body apparatus 2 held with the other hand of the user, the display range of display on the display 12 can be changed. For example, the acceleration sensor 89 of the main body apparatus 2 can detect each of the accelerations in the xyz axis directions as an operation input, and the angular velocity sensor 90 can detect each of the angular velocities about the xyz axis directions as an operation input. The motion or the orientation of the main body of the main body apparatus 2 can be calculated using the accelerations and/or the angular velocities. In the exemplary embodiment, as an example, in accordance with a change in the orientation of the main body apparatus 2 in real space, the orientation of a virtual camera set in the virtual space to display an image on the display 12 can be changed. Specifically, the same change as a change in the orientation of the main body apparatus 2 in real space is given to the virtual camera placed at a fixed position in the virtual space, whereby an image of the virtual space as if peeping at the virtual space through the display 12 of the main body apparatus 2 can be generated. As another example, in accordance with the movement (a change in the position) of the main body apparatus 2 in real space in addition to the above change in the orientation, the position of the virtual camera may be moved in the virtual space.

FIG. 8 shows an example of an image displayed in the process of moving an object in the virtual space by operating the main body apparatus 2 and the right controller 4. As shown in FIG. 8, in this exemplary process, an image in which a plurality of objects (a first object OBJ1 and a second object OBJ2 in the example of FIG. 8) are placed in the virtual space is displayed on the main body apparatus 2. Then, the user operates the analog stick 52 and the operation buttons 53 to 56 of the right controller 4 or performs the operation of moving the main body of the right controller 4, and thereby can select as an operation target any of the plurality of objects placed in the virtual space or move the object selected as the operation target in the virtual space. The user changes the orientation of the main body apparatus 2 and thereby can change the orientation of the virtual camera set in the virtual space and change the range of the virtual space displayed on the display 12.

For example, on the display 12, an indicator T is displayed that indicates a position pointed at by the main body of the right controller 4. As an example, after the indicator T is displayed at an initial position in the display 12 (e.g., the center of the display 12), the display position of the indicator T changes in accordance with a change in the orientation of the main body of the right controller 4. Then, when the user performs a predetermined operation using the right controller 4 (e.g., the operation of pressing the operation button (A-button) 53 or the operation of pressing the operation button (R-button) 60), an object OBJ displayed in a superimposed manner on the indicator T at the time of the operation is selected as an operation target. Then, in the period when the above selection operation continues, the state where the operation target is selected is continued. The selection operation ends, whereby the state where the operation target is selected is cancelled.

In accordance with an operation using the right controller 4 after that, the object OBJ set as the operation target can be moved in the virtual space. For example, when the position pointed at by the main body of the right controller 4 is moved in up, down, left, and right directions in the state where the operation of setting the operation target is continued, the object OBJ set as the operation target is moved in up, down, left, and right directions in the virtual space about the virtual camera. When the stick 52 of the right controller 4 is tilted in front and back directions in the state where the operation of setting the operation target is continued, the object OBJ set as the operation target is moved by distancing the object OBJ from or bringing the object OBJ close to the virtual camera in the virtual space. Then, when the operation of setting the operation target ends, the movement of the operation target is stopped, the object as the operation target is placed at a position in the virtual space at the time of the end, and the process of moving the object is cancelled.

The operation method for moving the object OBJ set as the operation target may not need to be the above operation method. For example, in accordance with the operation of tilting the stick 52 of the right controller 4, the object OBJ set as the operation target may be moved in the up, down, left, and right directions in the virtual space about the virtual camera. In accordance with the operation of pressing the operation buttons 60 and 61 of the right controller 4, the object OBJ set as the operation target may be moved by distancing the object OBJ from or bringing the object OBJ close to the virtual camera in the virtual space. When the object OBJ is operated with a mouse, in accordance with an indicated position specified by operating the mouse, the object OBJ set as the operation target may be moved in the up, down, left, and right directions in the virtual space about the virtual camera, and in accordance with the operation of right-clicking and left-clicking the mouse, the object OBJ set as the operation target may be moved in the virtual space by distancing the object OBJ from or bringing the object OBJ close to the virtual camera. When the object OBJ is operated with a touch pad, in accordance with an indicated position specified by operating the touch pad, the object OBJ set as the operation target may be moved in the up, down, left, and right directions in the virtual space about the virtual camera, and in accordance with the position where the touch pad is held down at a fixed position, the object OBJ set as the operation target may be moved in the virtual space by distancing the object OBJ from or bringing the object OBJ close to the virtual camera.

Each of the left controller 3 and the right controller 4 can also be operated in the form of an apparatus unified by attaching the left controller 3 and the right controller 4 to the main body apparatus 2. In this case, since the left controller 3 and the right controller 4 are unified with the main body apparatus 2, it is difficult to perform an operation based on a position pointed at by the left controller 3 and/or the right controller 4. Thus, it is possible that the operation method for moving the object OBJ set as the operation target using the above unified apparatus uses the left and right sticks 32 and 52. For example, also in an operation using the above unified apparatus, when the operation of pressing the operation button (A-button) 53 of the right controller 4 attached to the main body apparatus 2 or the operation of pressing the operation button (R-button) 60 is performed, the object OBJ displayed in a superimposed manner on the indicator T at the time of the operation is selected as an operation target. Then, in accordance with the operation of tilting the stick 32 of the left controller 3 attached to the main body apparatus 2, the object OBJ set as the operation target is moved in the up, down, left, and right directions in the virtual space about the virtual camera. In accordance with the operation of tilting the stick 52 of the right controller 34 attached to the main body apparatus 2, the object OBJ set as the operation target is moved in the virtual space by distancing the object OBJ from or bringing the object OBJ close to the virtual camera. When an operation is thus performed using the unified apparatus, the direction of the virtual space displayed on the display 12 also changes in accordance with the orientation of the unified apparatus in real space. Thus, it is possible that the tilt direction of the stick is also changed in accordance with the change in the direction of the virtual space. For example, in the orientation in which a down direction of the above unified apparatus (a negative y-axis direction shown in FIG. 1) is the vertical direction in real space, a down direction of the display 12 (the negative y-axis direction shown in FIG. 1) is the vertical direction in the virtual space. Thus, when the operation of tilting the stick 32 of the left controller 3 in a down direction (the negative y-axis direction shown in FIG. 1) is performed, it is intuitive to set the operation as an instruction to perform an operation in a down direction in the virtual space displayed on the display 12. Thus, based on the operation of tilting the stick 32 in the down direction, the object is moved in the down direction in the virtual space. Meanwhile, in the orientation in which a right direction of the above unified apparatus (a positive x-axis direction shown in FIG. 1) is the vertical direction in real space, a right direction of the display 12 (the positive x-axis direction shown in FIG. 1) is the vertical direction in the virtual space. Thus, when the operation of tilting the stick 32 of the left controller 3 in a right direction (the positive x-axis direction shown in FIG. 1) is performed, it is intuitive to set the operation as an instruction to perform an operation in a down direction in the virtual space displayed on the display 12. Thus, based on the operation of tilting the stick 32 in the right direction, the object is moved in the down direction in the virtual space.

Figure 9:
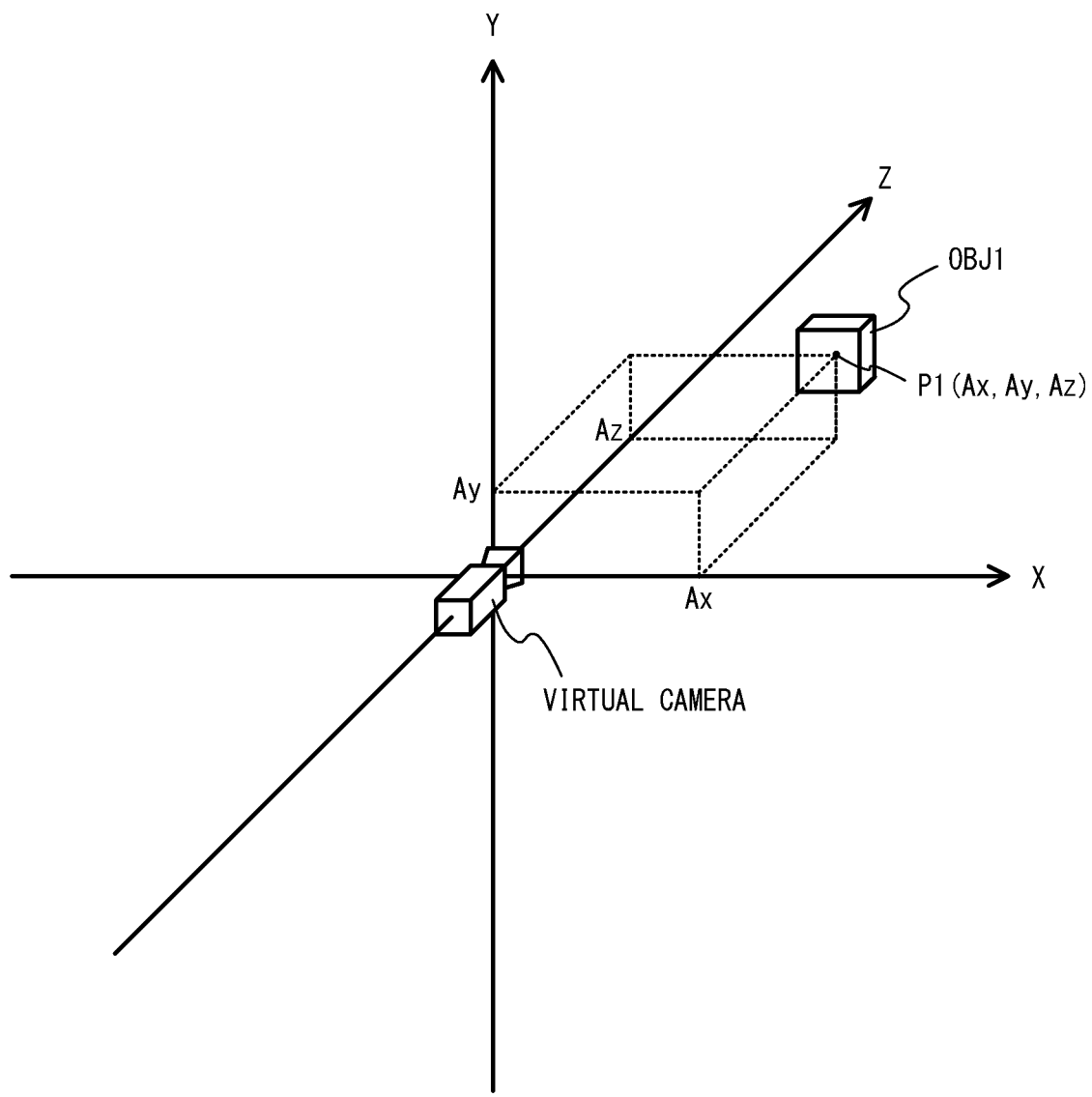
FIG. 9 is a diagram showing a non-limiting example of a world coordinate position in a first object OBJ1 selected as an operation target.
Figure 10:
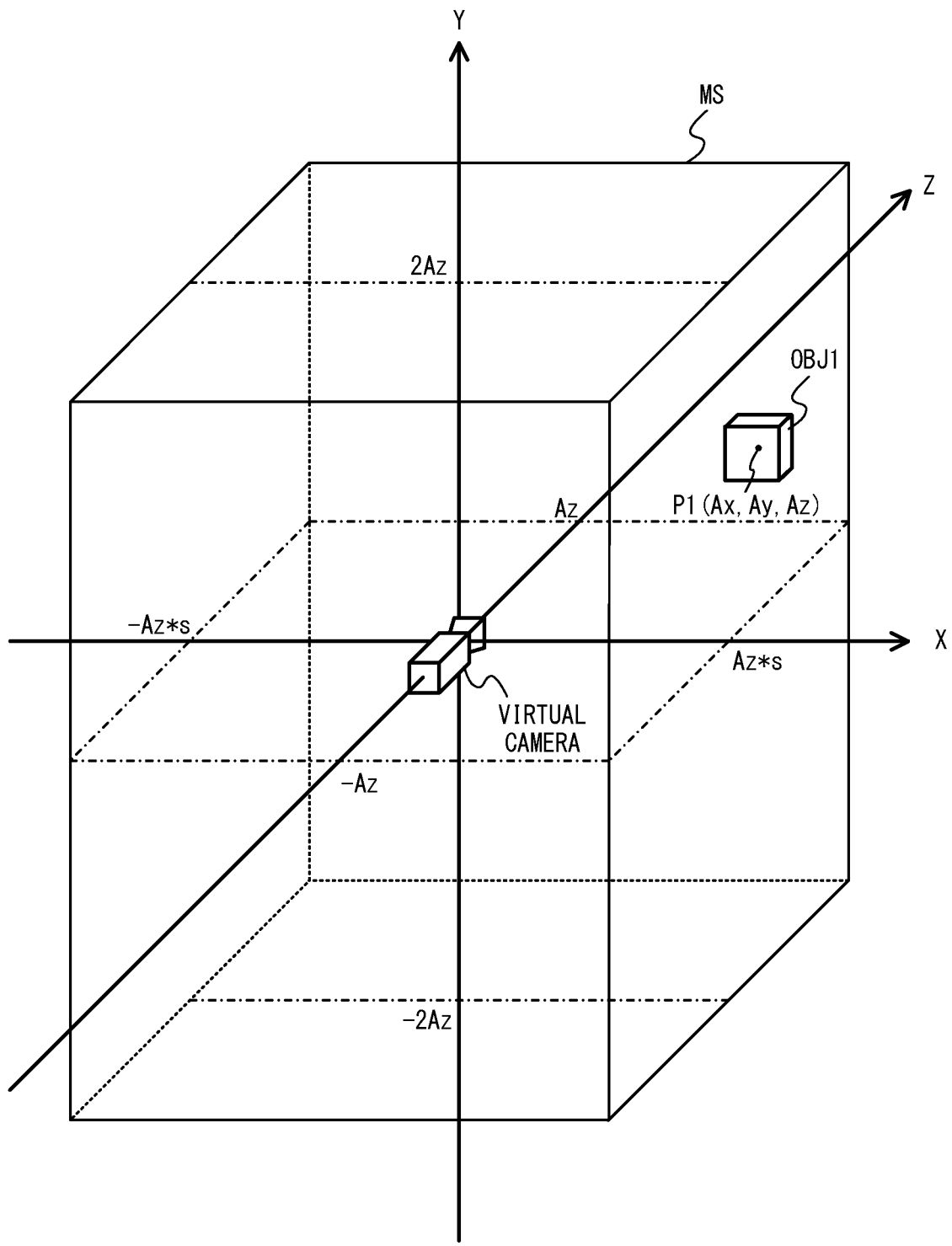
FIG. 10 is a diagram showing a non-limiting example of a movable surface MS having a cuboid shape set for the first object OBJ1 selected as the operation target.
Figure 11:
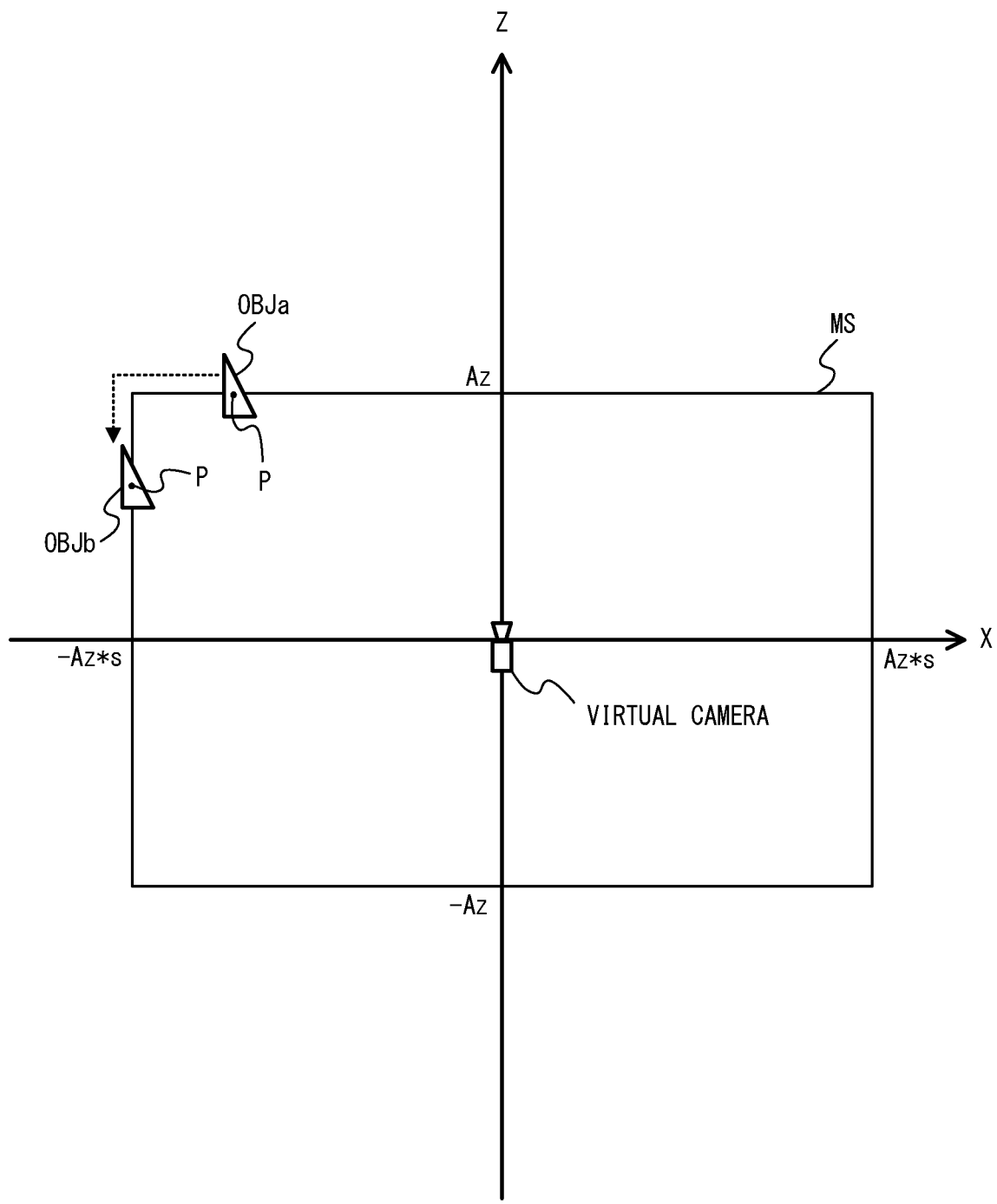
FIG. 11 is a diagram showing a non-limiting example where the first object OBJ1 moves along the movable surface MS, when viewed from an upper surface side.
Figure 12:
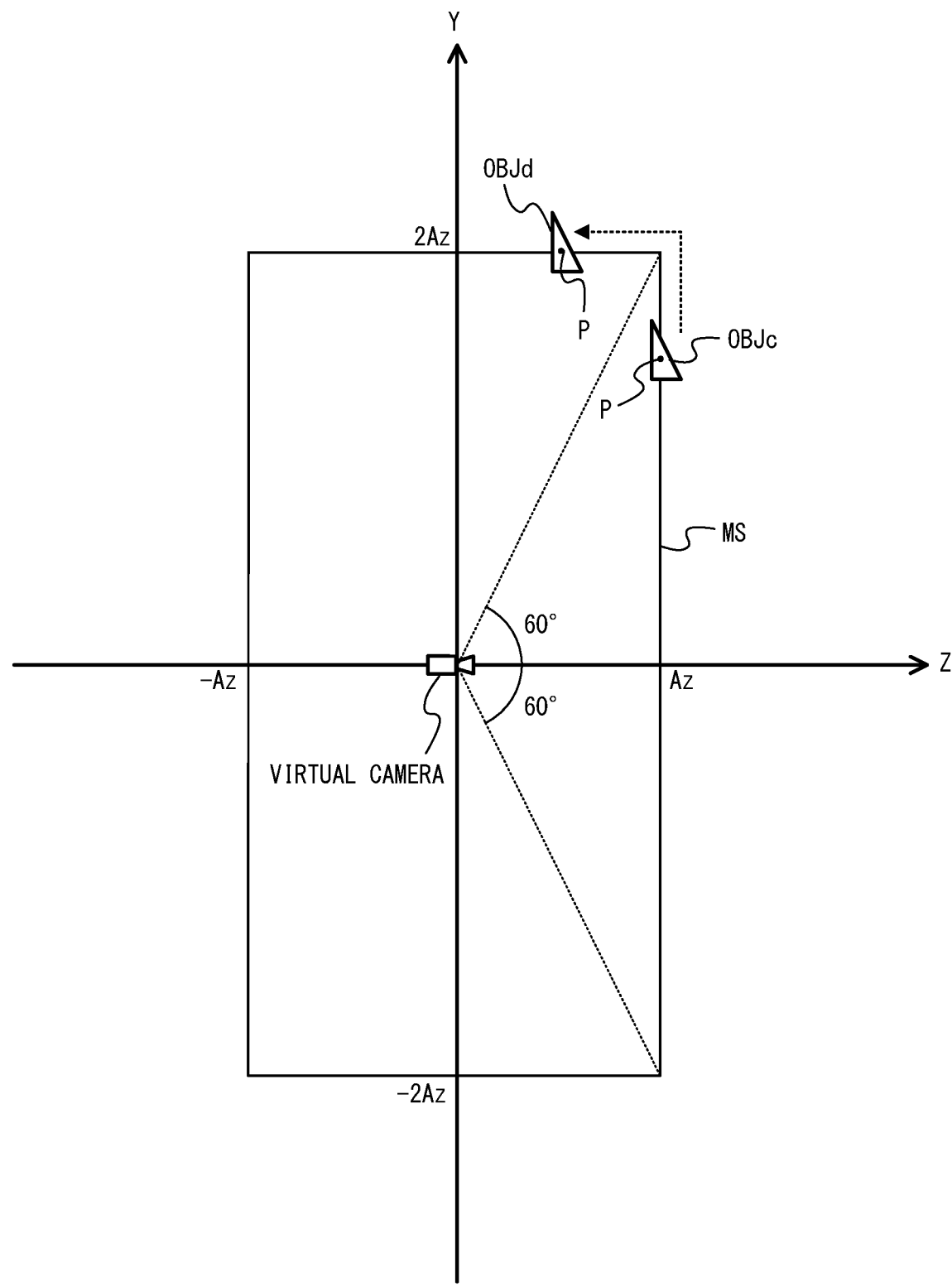
FIG. 12 is a diagram showing another non-limiting example where the first object OBJ1 moves along the movable surface MS, when viewed from a right side surface side.
Figure 13:
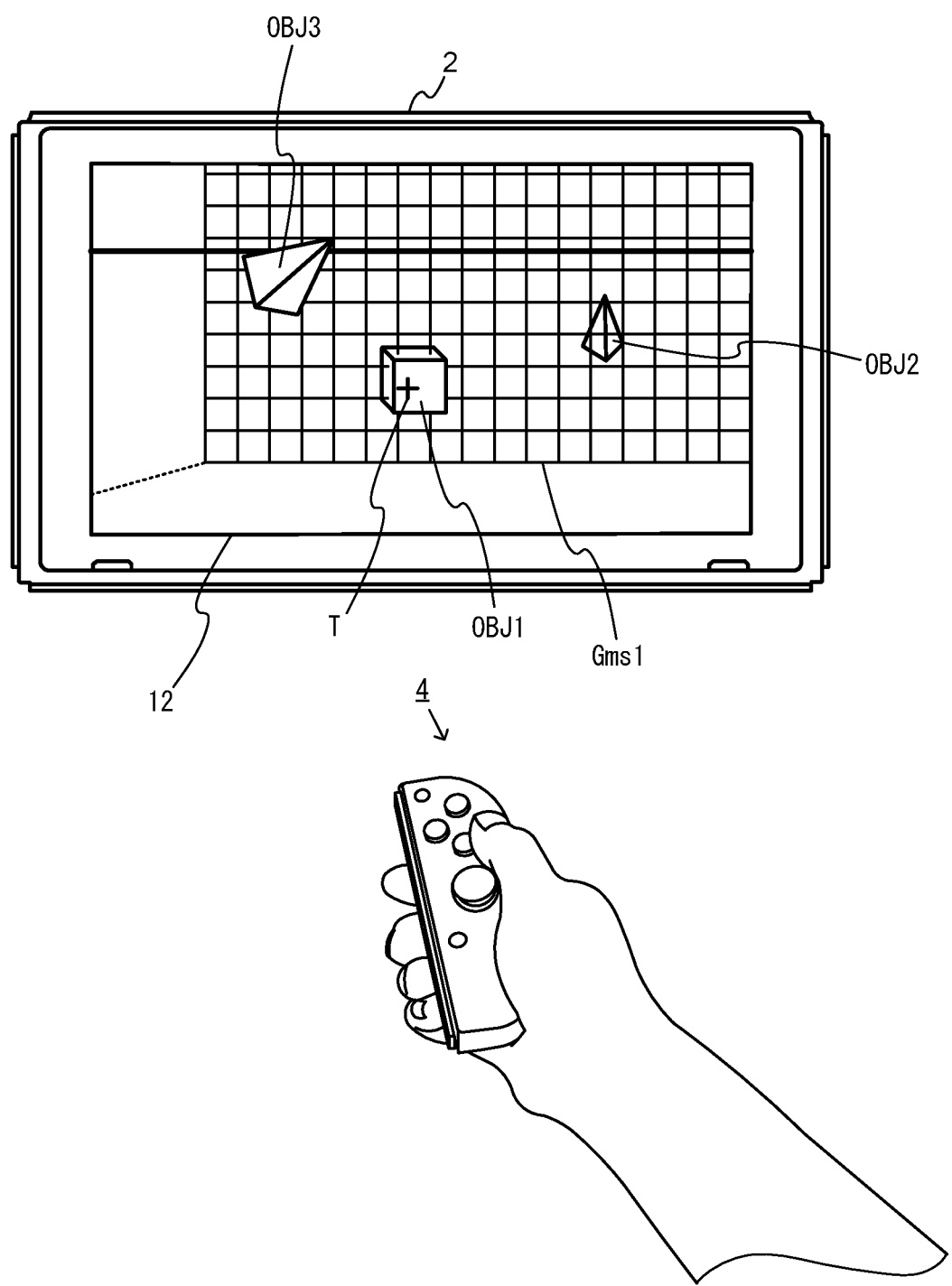
FIG. 13 is a diagram showing a non-limiting example where some of component surfaces of the movable surface MS are displayed in a visible grid Gms1.
Figure 15:
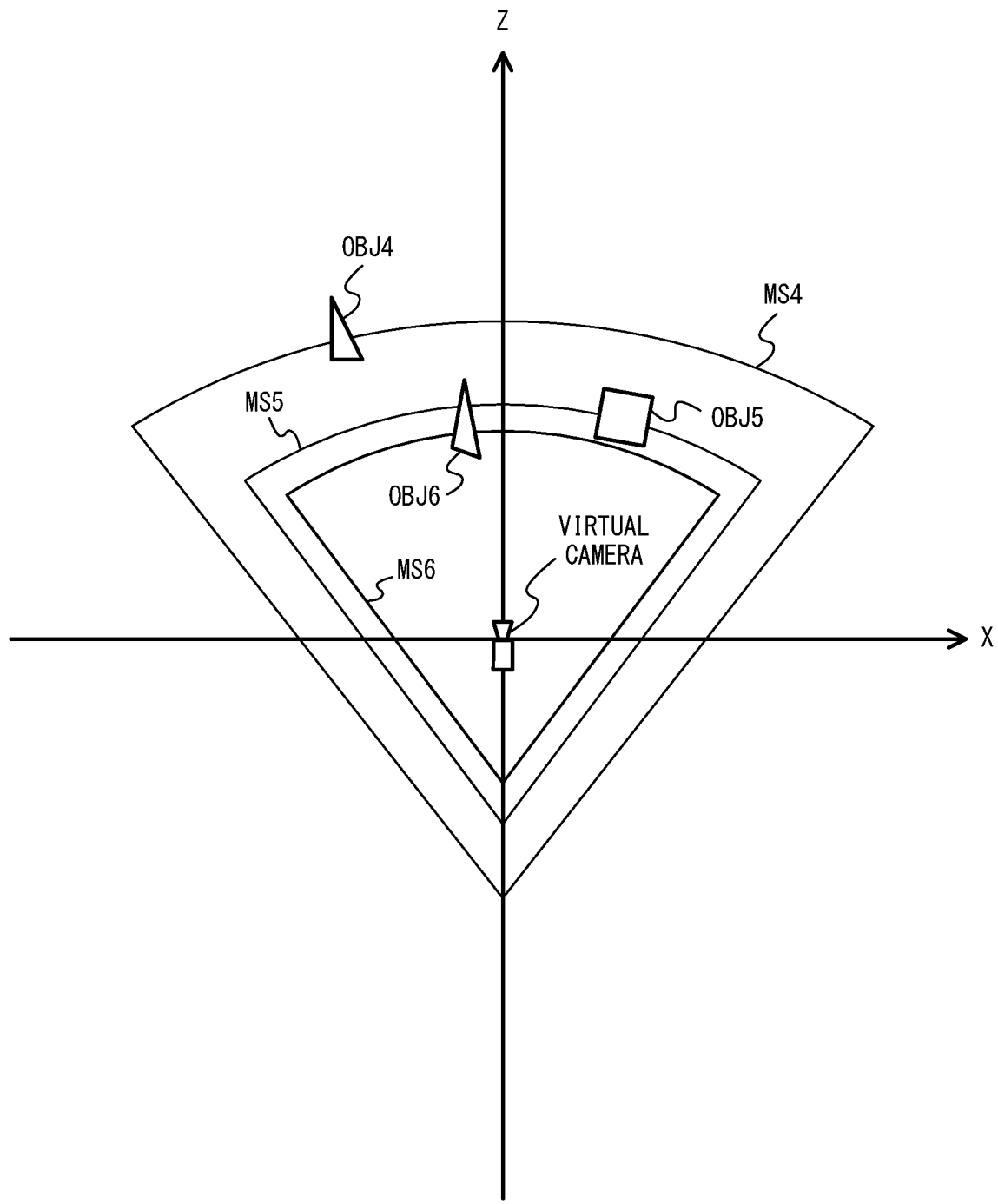
FIG. 15 is a diagram showing non-limiting examples of movable surfaces MS4 to MS6 set for a plurality of objects OBJ4 to OBJ6, respectively.

In the exemplary embodiment, when an object is moved in the virtual space, a movable surface on which the object is movable is defined in the virtual space. With reference to FIGS. 9 to 15, the movable surface set in the virtual space is described below. FIG. 9 is a diagram showing an example of a world coordinate position in the first object OBJ1 selected as an operation target. FIG. 10 is a diagram showing an example of a movable surface MS having a cuboid shape set for the first object OBJ1 selected as the operation target. FIG. 11 is a diagram showing an example where the object OBJ moves along the movable surface MS, when viewed from an upper surface side. FIG. 12 is a diagram showing another example where the object OBJ moves along the movable surface MS, when viewed from a right side surface side. FIG. 13 is a diagram showing an example where some of component surfaces of the movable surface MS are displayed in a visible grid Gms1. FIG. 14 is a diagram showing examples of movable surfaces MS1 to MS3 set for a plurality of objects OBJ1 to OBJ3, respectively. FIG. 15 is a diagram showing examples of movable surfaces MS4 to MS6 set for a plurality of objects OBJ4 to OBJ6, respectively.

In FIG. 9, when the first object OBJ1 is selected as an operation target, the position of the first object OBJ1 is acquired. For example, in the exemplary embodiment, XYZ axis coordinates that are a world coordinate system based on the position of the virtual camera are set, and position coordinates P1(Ax, Ay, Az) of the first object OBJ1 are acquired based on the XYZ axis coordinates. Here, in the XYZ axis coordinates based on the position of the virtual camera, the viewpoint position of the virtual camera is the origin, a horizontal direction as the line-of-sight direction of the virtual camera at the initial position of the virtual camera is a positive Z-axis direction, a right horizontal direction of the virtual camera at the initial position of the virtual camera is a positive X-axis direction, and a directly up direction of the virtual camera at the initial position of the virtual camera is a positive Y-axis direction. Then, the position coordinates of a reference (e.g., the center of gravity) in the first object OBJ1 in the XYZ axis coordinate system are acquired as the position coordinates P1(Ax, Ay, Az) of the first object OBJ1.

Based on the position coordinates P1(Ax, Ay, Az) of the first object OBJ1, a movable surface MS having a cuboid shape is defined, and the first object OBJ1 becomes movable along the movable surface MS in accordance with a user operation. As an example, in the position coordinates P1(Ax, Ay, Az) of the first object OBJ1, the greater of the absolute values of Ax and Az is set as AL. Then, as a first example, when the angle between a line segment connecting the origin and a point (AL, Ay) and a horizontal axis (a horizontal direction axis) in a two-dimensional coordinate system is greater than or equal to a first angle (e.g., 60°), on the assumption that the first object OBJ1 as the operation target is placed on an upper surface (a surface formed further in the positive Y-axis direction) of the movable surface MS having the cuboid shape, the movable surface MS is set. As a second example, when the angle between the line segment connecting the origin and the point (AL, Ay) and the horizontal axis (the horizontal direction axis) in the two-dimensional coordinate system is less than or equal to a second angle (e.g., −60°), on the assumption that the first object OBJ1 as the operation target is placed on a lower surface (a surface formed further in a negative Y-axis direction) of the movable surface MS having the cuboid shape, the movable surface MS is set. As a third example, in the case of neither the first example nor the second example (i.e., when the angle between the line segment connecting the origin and the point (AL, Ay) and the horizontal axis (the horizontal direction axis) in the two-dimensional coordinate system is smaller than the first angle (e.g., 60°) and greater than the second angle (e.g., −60°)), on the assumption that the first object OBJ1 as the operation target is placed on a surface in the direction of AL (a right side surface formed further in the positive X-axis direction when AL is Ax having a positive value, a left side surface formed further in a negative X-axis direction when AL is Ax having a negative value, a front surface formed further in the positive Z-axis direction when AL is Az having a positive value, or a back surface formed further in a negative Z-axis direction when AL is Az having a negative value) of the movable surface MS having the cuboid shape, the movable surface MS is set.

For example, in the cases of the first example and the second example, the length from the upper surface (the surface formed further in the positive Y-axis direction) to the lower surface (the surface formed further in the negative Y-axis direction) of the movable surface MS having the cuboid shape is set to twice |Ay|, and the lengths of the other sides of the cuboid are determined based on the ratio between sides set in advance. In the third example, the length from the surface in the direction of AL to an opposing surface opposed to this surface of the movable surface MS having the cuboid shape (the length between the right side surface formed further in the positive X-axis direction and the left side surface formed further in the negative X-axis direction when AL is Ax, or the length between the front surface formed further in the positive Z-axis direction and the back surface formed further in the negative Z-axis direction when AL is Az) is set to twice |AL|, and the lengths of the other sides of the cuboid are determined based on the ratio between sides set in advance.

As an example, as shown in FIG. 10, when the absolute value of Az is greater than the absolute value of Ax, and Az has a positive value, and the position coordinates P1(Ax, Ay, Az) of the first object OBJ1 correspond to the third example, on the assumption that the first object OBJ1 as the operation target is placed on the front surface (the surface formed further in the positive Z-axis direction) of the movable surface MS having the cuboid shape, the movable surface MS is set. For example, the front surface of the cuboid is a surface on which Z=Az and which includes the position coordinates P1(Ax, Ay, Az) of the first object OBJ1. Then, the back surface of the cuboid is a surface on which Z=−Az. The length between the front surface and the back surface of the cuboid is twice |Az|. The right side surface of the cuboid is a surface on which X=Az*s, which is obtained by multiplying Az by a ratio (a coefficient s) set in advance. The left side surface of the cuboid is a surface on which X=−Az*s. The length between the right side surface and the left side surface is twice |Az*s|. To place the first object OBJ1 on the upper surface of the cuboid when the position coordinates P1(Ax, Ay, Az) of the first object OBJ1 move to a state corresponding to the first example, the upper surface of the cuboid is a surface on which Y=2Az, which is twice Az. To place the first object OBJ1 on the lower surface of the cuboid when the position coordinates P1(Ax, Ay, Az) of the first object OBJ1 move to a state corresponding to the second example, the lower surface of the cuboid is a surface on which Y=−2Az, which is a negative value twice Az. The length between the upper surface and the lower surface of the cuboid is four times |Az|. The movable surface MS having the cuboid shape is composed of six component surfaces (the front surface, the back surface, the left side surface, the right side surface, the upper surface, and the lower surface). In the exemplary embodiment, as examples of a first surface and a second surface, two adjacent component surfaces intersecting each other among the component surfaces are used.

When the above operation of moving the first object OBJ1 as the operation target in the up, down, left, and right directions about the virtual camera is performed, the first object OBJ1 moves along the movable surface MS set based on the position of the first object OBJ1. Then, as is clear from the fact that the movable surface MS is formed into a cuboid shape, each component surface of the movable surface MS is orthogonal to another one of the other component surfaces in a portion where the component surface intersects the other component surface. Thus, when the first object OBJ1 as the operation target moves in the up, down, left, and right directions about the virtual camera along the movable surface MS, the first object OBJ1 passes through the portion where the component surfaces intersect each other, thereby changing to a movement along a surface different in placement direction by 90°.

For example, as shown in FIG. 11, when the movement of the object OBJ as the operation target shifts from a movement in the negative X-axis direction along the front surface of the cuboid forming the movable surface MS to a movement along the left side surface of the cuboid, the moving direction of the object OBJ changes from the movement in the negative X-axis direction along the front surface (an object OBJa shown in FIG. 11) to the movement in the negative Z-axis direction along the left side surface (an object OBJb shown in FIG. 11). That is, when the operation of moving the object OBJ as the operation target in the left direction in the virtual space is performed, not only does the object OBJ move along the front surface away from the virtual camera in the left direction, but the object OBJ also passes through a portion where the front surface intersects the left side surface, whereby the moving direction of the object OBJ changes to the back direction along the left side surface. Thus, the object OBJ can move by circulating around the virtual camera while combining a plurality of linear movements in the virtual space.

As shown in FIG. 12, when the movement of the object OBJ as the operation target shifts from a movement in the positive Y-axis direction along the front surface of the cuboid forming the movable surface MS to a movement along the upper surface of the cuboid, the moving direction of the object OBJ changes from the movement in the positive Y-axis direction along the front surface (an object OBJc shown in FIG. 12) to the movement in the negative Z-axis direction along the upper surface (an object OBJd shown in FIG. 12). That is, when the operation of moving the object OBJ as the operation target in the up direction in the virtual space is performed, not only does the object OBJ move along the front surface away from the virtual camera in the up direction, but the object OBJ also passes through a portion where the front surface intersects the upper surface, whereby the moving direction of the object OBJ changes to the back direction along the upper surface. Thus, the object OBJ can move by circulating around the virtual camera while combining a plurality of linear movements in the virtual space.

As shown in FIGS. 11 and 12, when the movement of the object OBJ as the operation target shifts to another component surface, the moving direction of the object OBJ is changed without changing the orientation of the object OBJ. That is, the object OBJ to be moved in the virtual space can move to another position without changing the orientation of the object OBJ before the movement. Thus, when the object OBJ as the operation target viewed from the virtual camera moves by circulating around the virtual camera in the virtual space, a portion of the object OBJ viewed from the virtual camera side changes. As another example, when the movement of the object OBJ as the operation target shifts to another component surface, the moving direction of the object OBJ may be changed while changing (e.g., rotating) the orientation of the object OBJ. In this case, the object OBJ to be moved in the virtual space moves to another position by changing the orientation of the object OBJ when shifting to a movement using another component surface. As an example, the moving direction of the object OBJ may be changed by rotating the orientation of the object OBJ by 90° when the movement of the object OBJ shifts to another component surface so that the moving direction set for the object OBJ as the operation target itself does not change (e.g., so that a front end portion of the object OBJ that moves does not change even if the movement of the object OBJ shifts to another component surface).

When the above depth movement operation for moving the object OBJ as the operation target by distancing the object OBJ from or bringing the object OBJ close to the virtual camera is performed, a movable surface MS different from the movable surface MS set based on the position of the object OBJ before the depth movement operation is performed is reset based on the position of the object OBJ moved by the depth movement operation. Then, when the operation of moving the object OBJ as the operation target in the up, down, left, and right directions about the virtual camera is performed after the depth movement operation, the object OBJ moves along the movable surface MS reset based on the position of the object OBJ moved by the depth movement operation. The movable surface MS reset by the depth movement operation is set in a cuboid shape based on the position of the object OBJ after the depth movement similarly to the above. Then, the movable surface MS reset by the depth movement operation expands or contracts in accordance with the positional relationship (distance) between the object OBJ as the operation target changed by the depth movement operation and the virtual camera, while maintaining the ratios between the sides of the cuboid shape of the movable surface MS set before the depth movement operation. Then, each component surface of the movable surface MS reset by the depth movement operation is also orthogonal to another one of the other component surfaces in a portion where the component surface intersects the other component surface. Thus, when the object OBJ as the operation target moves in the up, down, left, and right directions about the virtual camera along the reset movable surface MS after the depth movement operation, the object OBJ passes through the portion where the component surfaces intersect each other, thereby changing to a movement along a surface different in placement direction by 90°.

Among the plurality of component surfaces forming the movable surface MS, a component surface on which the object OBJ as the operation target is placed may be displayed in a display form different from those of the other component surfaces. For example, as shown in FIG. 13, in the range where, among the plurality of component surfaces forming the movable surface MS, a component surface on which the object OBJ as the operation target is placed is defined, a visible grid Gms1 may be displayed. In this case, the component surfaces other than the component surface on which the object OBJ as the operation target is placed are not displayed, or are displayed in display forms different from the visible grid, whereby it is possible to make the user aware of a reference surface on which the object OBJ is movable at the current moment. In the exemplary embodiment, as an example of display of a component surface on which the object OBJ is placed in a display form different from that of another surface, the visible grid Gms1 is used.

Even if the orientation of the virtual camera changes in the virtual space, the movable surface MS is fixedly defined in the virtual space. That is, the movable surface MS is fixedly set in the world coordinate system based on the position of the object OBJ based on the virtual camera in the virtual space, and even if the orientation of the virtual camera changes in the state where the object OBJ moves along the defined movable surface MS, the position or the size of the movable surface MS does not change.

When a plurality of objects OBJ are placed in the virtual space, the movable surface MS is defined for each of the plurality of objects OBJ. Typically, the movable surface MS defined for each of the plurality of objects OBJ is defined in a different size around the virtual camera.

For example, as shown in FIG. 14, when three objects OBJ1 to OBJ3 are placed in the virtual space, based on the positions of the three objects OBJ1 to OBJ3, different movable surfaces MS1 to MS3 are defined for the three objects OBJ1 to OBJ3, respectively. Each of the movable surfaces MS1 to MS3 has the above cuboid shape, and the ratios between the sides are the same. Thus, each of the movable surfaces MS1 to MS3 is defined around the virtual camera with the virtual camera at the center and has a cuboid shape expanding or contracting in accordance with the positional relationship (distance) between each of the objects OBJ1 to OBJ3 and the virtual camera. Thus, the movable surface MS defined for each of the plurality of objects OBJ placed in the virtual space is defined at the position where the movable surface MS is laminated with the virtual camera at the center. The above lamination indicates that parallel to a movable surface MS defined to be closest to the virtual camera, another movable surface MS relatively distant from the virtual camera is defined to surround the virtual camera. Each of the component surfaces of the movable surface MS is defined such that the further away from the virtual camera the position of the component surface is, the relatively wider the surface of the component surface is.

The movable surface MS reset based on the position of the object OBJ moved by the above depth movement operation is placed by being laminated on the movable surface MS set before the movement. The timing when the movable surface MS in the laminated state is defined may be before the movement, during the movement, or after the movement. In the first case, it is possible that in accordance with the position of the object OBJ movable by the depth movement operation, a plurality of laminated movable surfaces MS are defined in advance, and in accordance with the position of the object OBJ moved by the depth movement operation, any of the plurality of movable surfaces MS is selected and reset. In the second case, every time the object OBJ moves by the depth movement operation, a movable surface MS is defined based on the position of the object OBJ, and in accordance with the position of the object OBJ for which the depth movement operation is finalized, a movable surface MS to be used after that is reset.

As described above, in the exemplary embodiment, when the object OBJ is moved in the virtual space, the object OBJ can be moved along the movable surface MS including a plurality of component surfaces at a predetermined angle (e.g., 90°) to each other in a portion where the component surfaces intersect each other. Thus, the object OBJ can be moved and placed in the virtual space as intended by the user. In the exemplary embodiment, the object OBJ can be moved along the movable surface MS fixed in the virtual space. Thus, it is possible to prevent a positional shift due to the motion of the virtual camera when the object OBJ is moved. In the exemplary embodiment, when the movement of the object OBJ shifts to a movement along another component surface, the moving direction of the object OBJ changes. However, even if the moving direction changes, the orientation of the object OBJ does not change. Thus, the exemplary embodiment is suitable for a case where the object OBJ moves without changing the orientation of the object OBJ. Further, in the exemplary embodiment, a component surface used in a movement enables the movement of the object along any of the up, down, front, rear, left, and right directions in the virtual space (i.e., the Y-axis direction that is the up-down direction, the Z-axis direction that is the front-back direction, and the X-axis direction that is the left-right direction). Thus, it is easy to place objects by aligning the objects based on the up, down, front, rear, left, and right directions in the virtual space. In the exemplary embodiment, a movable surface having a cuboid shape is defined around the virtual camera. Thus, in addition to the ability to prevent an object from moving away from the field of view of the virtual camera, thereby limiting the movement of the object to the periphery of the virtual camera, it is possible to move objects to enable the above alignment and placement of the objects.

In the above description, an example has been used where the movable surface MS is composed of a cuboid shape obtained by combining a plurality of flat surfaces. Alternatively, the movable surface MS may be composed of another three-dimensional shape. For example, the movable surface MS may be composed of another three-dimensional shape obtained by combining a plurality of flat surfaces, such as a prism shape, a pyramid shape, a frustum shape, or a regular polyhedron shape. In this case, the angle formed in a portion where the component surfaces forming the movable surface MS intersect each other may not need to be 90°, and may be an acute angle or an obtuse angle. A gap may be formed in at least one place between component surfaces defined to be adjacent to each other among the plurality of component surfaces forming the movable surface MS.

At least one of the component surfaces forming the movable surface MS may be composed of a curved surface. For example, as shown in FIG. 15, the movable surface MS may be composed of a fan column shape having a fan-shaped cross section. As an example, the movable surface MS may be formed such that the virtual camera is placed within a fan column shape forming the movable surface MS. In this case, the movable surface MS may be formed such that the viewpoint of the virtual camera is placed at the position of the center of gravity of the fan column shape, or the movable surface MS may be formed such that the viewpoint of the virtual camera is placed at a position shifted by a predetermined length from the center of gravity of the fan column shape to the pivot side of the fan shape. As another example, the movable surface MS may be formed such that the virtual camera is placed at the position of the pivot of the fan shape of a fan column shape forming the movable surface MS.

As described above, even when at least one of the component surfaces forming the movable surface MS is composed of a curved surface, the movable surface MS defined for each of the plurality of objects OBJ set in the virtual space may be defined in a different size. For example, as shown in FIG. 15, when three objects OBJ4 to OBJ6 are placed in the virtual space, based on the positions of the three objects OBJ4 to OBJ6, different movable surfaces MS4 to MS6 are defined for the three objects OBJ4 to OBJ6, respectively. Each of the movable surfaces MS4 to MS6 has a fan column shape in which one of the component surfaces (a front surface in the example of FIG. 15) is a curved surface, and the ratios between the sides and the circular arc are the same. Thus, each of the movable surfaces MS4 to MS6 is defined around the virtual camera and has a fan column shape expanding or contracting in accordance with the positional relationship (distance) between each of the objects OBJ4 to OBJ6 and the virtual camera. Thus, the movable surface MS defined for each of the plurality of objects OBJ placed in the virtual space is defined at the position where the movable surface MS is laminated around the virtual camera.

The movable surface MS is composed of a three-dimensional shape including a plurality of component surfaces. At least one of the component surfaces may be provided as a surface on which an object cannot move. A portion where an object cannot move may be provided in a part of the component surfaces. As a first example, among the plurality of component surfaces forming the movable surface MS, the lower surface (the component surface formed further in the negative Y-axis direction) located in a lower portion of the virtual space and/or the upper surface (the component surface formed further in the positive Y-axis direction) located in an upper portion of the virtual space may be surfaces on which an object cannot move. As a second example, among the plurality of component surfaces forming the movable surface MS, the lower surface (the component surface formed further in the negative Z-axis direction) located in a back portion of the virtual space may be a surface on which an object cannot move. As a third example, among the plurality of component surfaces forming the movable surface MS, a portion formed below a field surface in the virtual space may be a surface on which an object cannot move. As a fourth example, among the plurality of component surfaces forming the movable surface MS, a portion overlapping an area that is not displayed on the display 12 (e.g., a black area that is the blind spot of the virtual camera and is not displayed) may be a surface on which an object cannot move.

The movable surface MS may only need to include a plurality of component surfaces, and may not need to have a three-dimensional shape. For example, the movable surface MS may be composed of partition shapes formed of three surfaces including a front surface formed in a front portion of the virtual space viewed from the virtual camera, a left surface formed in a left portion, and a right surface formed in a right portion, or two surfaces including a left sloping surface formed in a front left portion of the virtual space viewed from the virtual camera, and a right sloping surface formed in a front right portion.

In the exemplary embodiment, even when the orientation of the virtual camera changes, the movable surface MS is fixedly defined in the virtual space. Alternatively, in accordance with the motion of the virtual camera, the position of the movable surface MS may be changed. As an example, in conjunction with a change in the orientation of the virtual camera, the directions of the component surfaces of the movable surface MS may be rotated at the same angle of rotation, and based on the directions of the virtual camera and an object as an operation target after the rotation and the distances to the directions, the size of the movable surface MS may be reset. In this case, the movable surface MS is not defined in the world coordinate system fixed in the virtual space, and the movable surface MS can be defined based on the position coordinates of the object in a screen coordinate system based on the orientation of the virtual camera. As another example, when the virtual camera is not fixed at a predetermined position in the virtual space, and the placement position of the virtual camera moves, the movable surface MS may be moved in conjunction with a change in the position of the virtual camera. In this case, it is possible that the position of the movable surface MS in the virtual space moves in conjunction with the movement of the virtual camera, but the size of the movable surface MS is reset in accordance with the changed distance between the virtual camera and an object as an operation target, without rotating the directions of the component surfaces of the movable surface MS. As in these examples, the position of the movable surface MS is changed in accordance with the motion of the virtual camera, whereby it is possible to achieve, regarding the movement of the object, a flexible movement reflecting the intention of the user and according to the orientation of the virtual camera.

The above exemplary embodiment can also be applied to a case where a stereoscopically viewable image is displayed. For example, a left-eye image and a right-eye image having parallax with each other for stereoscopically viewing the virtual space are displayed in a left side area and a right side area, respectively, of the display 12. Then, when the main body apparatus 2 is attached, the user views the left-eye image and the right-eye image displayed on the display 12 with their left and right eyes using a goggle apparatus enabling the user to view only the left-eye image displayed in the left side area through a left-eye lens and enabling the user to view only the right-eye image displayed in the right side area through a right-eye lens, whereby a stereoscopically viewable virtual space image can be displayed. Even when the stereoscopically viewable virtual space image is thus displayed on the display 12, the movable surface MS is similarly defined in the virtual space based on a pair of a left-eye virtual camera and a right-eye virtual camera set in the virtual space, whereby it is possible to similarly achieve the process of moving an object as an operation target. When the user views the stereoscopically viewable image by attaching the main body apparatus 2 to the goggle apparatus, the orientation of the virtual camera may be controlled in accordance with the orientation of the main body apparatus 2, or the orientation of the virtual camera may be controlled in accordance with the orientation of the goggle apparatus. It goes without saying that not only the orientation of the main body apparatus 2 but also the orientation of the goggle apparatus can be calculated using data detected by inertial sensors provided in the main body apparatus 2 (the acceleration sensor 89 and/or the angular velocity sensor 90). When a goggle apparatus including a display screen and inertial sensors is used, the above stereoscopically viewable virtual space image may be displayed on the display screen. In this case, the orientation of the virtual camera may be controlled based on the detection of the inertial sensors provided in the goggle apparatus.

Figure 16:
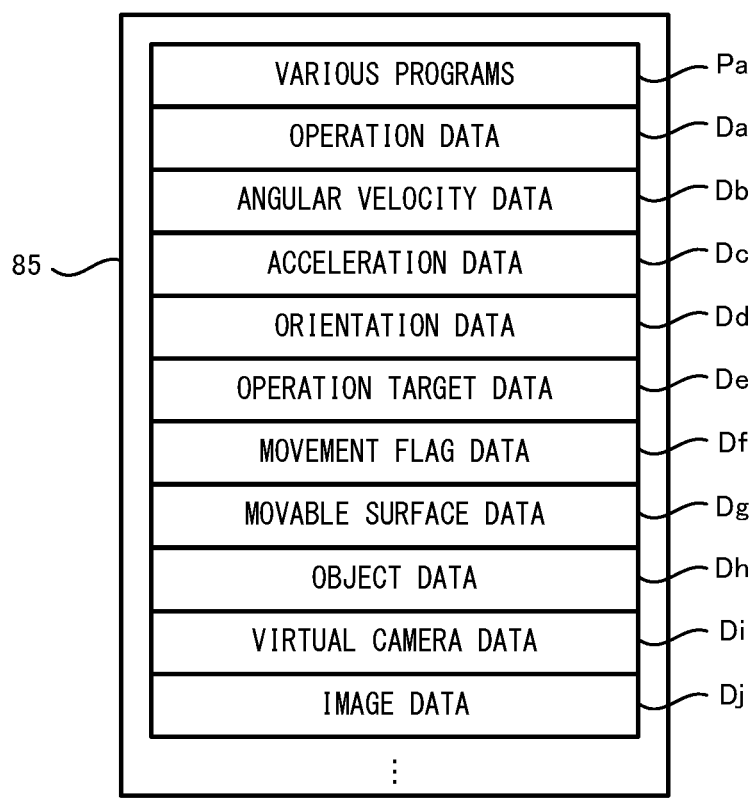
FIG. 16 is a diagram showing a non-limiting example of a data area of a DRAM 85 of the main body apparatus 2 in the exemplary embodiment.
Figure 17:
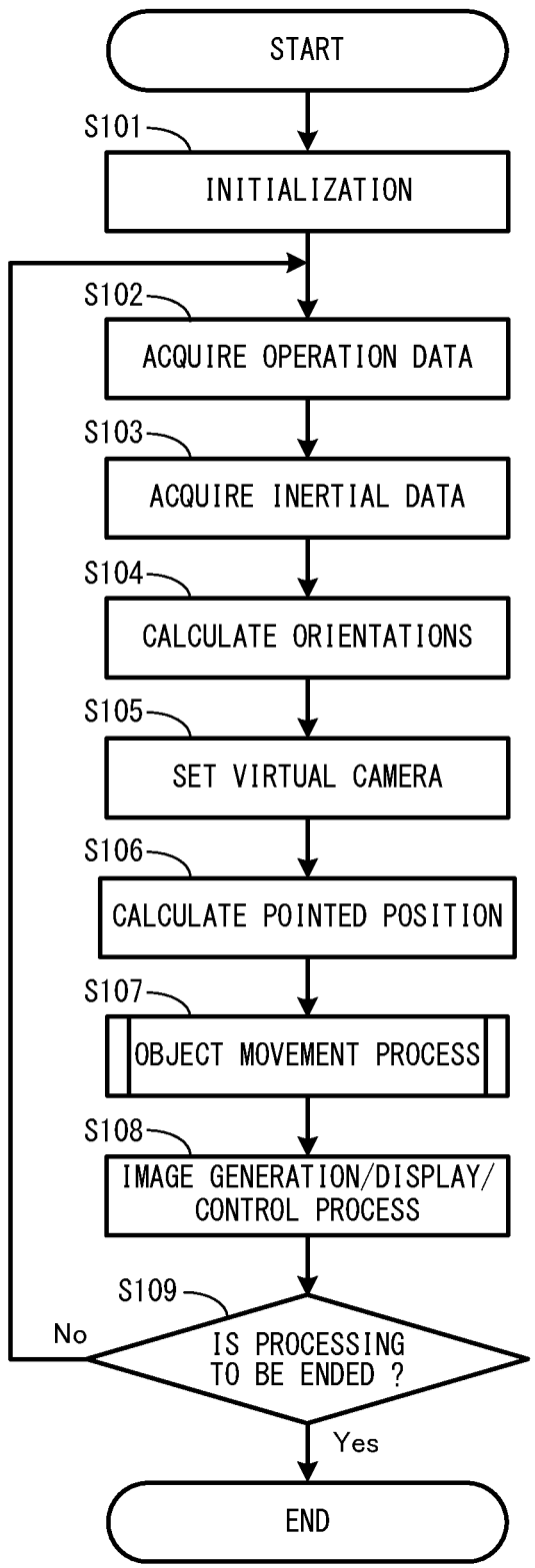
FIG. 17 is a flow chart showing a non-limiting example of information processing executed by the game system 1.
Figure 18:
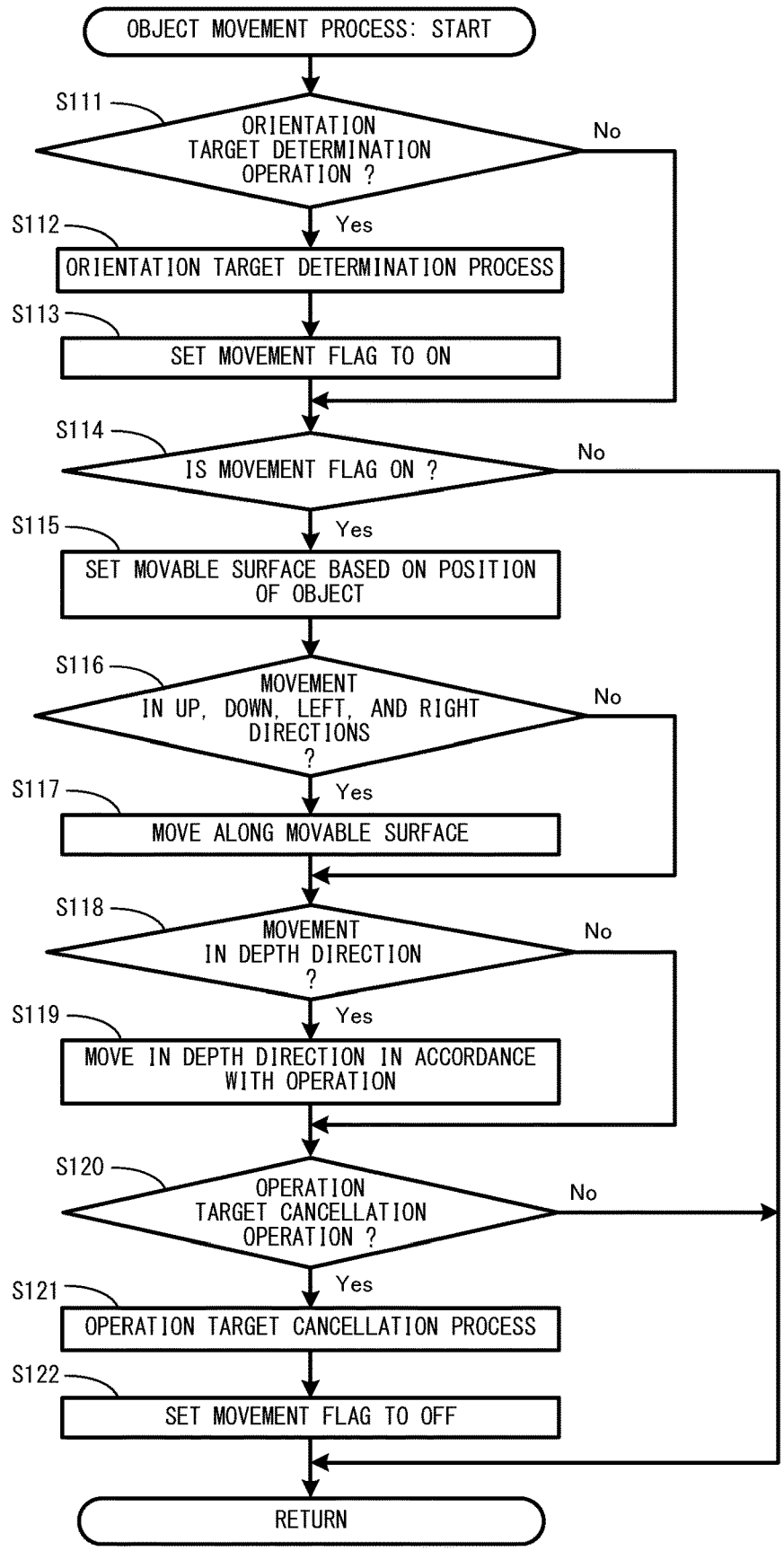
FIG. 18 is a subroutine showing a non-limiting example of the details of an object movement process performed in step S106 in FIG. 17.

Next, with reference to FIGS. 16 to 18, a description is given of an example of a specific process executed by the game system 1 in the exemplary embodiment. FIG. 16 is a diagram showing an example of a data area set in the DRAM 85 of the main body apparatus 2 in the exemplary embodiment. It should be noted that in the DRAM 85, in addition to the data shown in FIG. 16, data used in another process is also stored, but is not described in detail here.

In a program storage area of the DRAM 85, various programs Pa, which are executed by the game system 1, are stored. In the exemplary embodiment, as the various programs Pa, a communication program for wirelessly communicating with the left controller 3 and/or the right controller 4, an application program (e.g., an editor for generating and editing a virtual space, or a game program) for performing information processing based on data acquired from the left controller 3 and/or the right controller 4, the orientation of the main body apparatus 2, and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process and information processing executed by the game system 1 is stored. In the exemplary embodiment, in the DRAM 85, operation data Da, angular velocity data Db, acceleration data Dc, orientation data Dd, operation target data De, movement flag data Df, movable surface data Dg, object data Dh, virtual camera data Di, image data Dj, and the like are stored.

The operation data Da is operation data appropriately acquired from each of the left controller 3 and/or the right controller 4. As described above, operation data transmitted from each of the left controller 3 and/or the right controller 4 includes information regarding an input (specifically, information regarding an operation or the detection result of each sensor) from each of the input sections (specifically, each button, each analog stick, and each sensor). In the exemplary embodiment, operation data is transmitted in a predetermined cycle from each of the left controller 3 and/or the right controller 4 through wireless communication, and the operation data Da is appropriately updated using the received operation data. It should be noted that the update cycle of the operation data Da may be such that the operation data Da is updated every frame, which is the cycle of the processing described later executed by the main body apparatus 2, or is updated every cycle in which the above operation data is transmitted through the wireless communication.

The angular velocity data Db is data indicating angular velocities generated in the main body apparatus 2. For example, the angular velocity data Db includes data indicating angular velocities about the xyz axes generated in the main body apparatus 2, and the like.

The acceleration data Dc is data indicating accelerations generated in the main body apparatus 2. For example, the acceleration data Dc includes data indicating accelerations in the xyz axis directions generated in the main body apparatus 2, and the like.

The orientation data Dd is data indicating the orientation of the main body apparatus 2 and the orientations of the left controller 3 and/or the right controller 4 in real space. As an example, the orientation data Dd is data regarding the orientation of the main body apparatus 2 based on a reference orientation, and data regarding the orientations of the left controller 3 and/or the right controller 4 based on reference orientations.

The operation target data De is data indicating an object set as an operation target to be moved in a virtual space. The movement flag data Df is data indicating a movement flag indicating whether or not the operation target is set. The movable surface data Dg is data indicating a movable surface set for the object set as the operation target.

The object data Dh is data indicating the position, the direction, the shape, the size, and the like of each of objects placed in the virtual space.

The virtual camera data Di is data indicating the position and the direction of a virtual camera in the virtual space.

The image data Dj is data for displaying images (e.g., an image of an object, an image of a visible grid, a field image, a background image, and the like) on the display screen (e.g., the display 12 of the main body apparatus 2).

Next, with reference to FIGS. 17 and 18, a detailed example of information processing according to the exemplary embodiment is described. FIG. 17 is a flow chart showing an example of information processing executed by the game system 1. FIG. 18 is a subroutine showing a detailed example of an object movement process performed in step S106 in FIG. 17. In the exemplary embodiment, a series of processes shown in FIGS. 17 and 18 is performed by the processor 81 executing a communication program or a predetermined application program (an editor or a game program) included in the various programs Pa. Further, the information processing shown in FIGS. 17 and 18 is started at any timing.

It should be noted that the processes of all of the steps in the flow charts shown in FIGS. 17 and 18 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 17 and 18 may be executed by the cooperation of a plurality of information processing apparatuses including the main body apparatus 2.

In FIG. 17, the processor 81 performs initialization in information processing (step S101), and the processing proceeds to the next step. For example, in the initialization, the processor 81 initializes parameters for performing the processing described below. For example, the processor 81 initializes the position and the orientation of a virtual camera in a virtual space (e.g., the orientation in which the line-of-sight direction is the horizontal direction) and updates the virtual camera data Di using the initialized position and orientation. The processor 81 sets an XYZ axis coordinate system where the initialized viewpoint of the virtual camera is the origin, the line-of-sight direction of the virtual camera is a positive Z-axis direction, the right direction of the virtual camera that is a horizontal direction perpendicular to the line-of-sight direction is a positive X-axis direction, and a directly up direction of the virtual camera perpendicular to the line-of-sight direction and the right direction is a positive Y-axis direction. Then, the processor 81 places a plurality of objects in the virtual space where the XYZ axis coordinate system is set, thereby generating the initial state of the virtual space. Then, the processor 81 updates the object data Dh using the position, the direction, the shape, the size, and the like of each of the objects. Further, the processor 81 sets the initial orientations of the main body apparatus 2 and the left controller 3 and/or the right controller 4 in real space, thereby updating the orientation data Dd. For example, the processor 81 sets as the initial orientation of the main body apparatus 2 the orientation in which a depth direction of the display 12 of the main body apparatus 2 is the horizontal direction in real space, and a down direction of the main body apparatus 2 (the negative y-axis direction shown in FIG. 1) is the vertical direction in real space. The processor 81 sets as the initial orientations of the left controller 3 and/or the right controller 4 the orientations in which the left controller 3 and/or the right controller point at the center of the display 12 such that the longitudinal direction of the left controller 3 and/or the right controller 4 (the positive y-axis direction shown in FIG. 1) is the depth direction of the display 12 of the main body apparatus 2.

Next, the processor 81 acquires operation data from the left controller 3 and/or the right controller 4 and updates the operation data Da (step S102), and the processing proceeds to the next step.

Next, the processor 81 acquires inertial data (acceleration data and/or angular velocity data) from the inertial sensors (the acceleration sensor 89 and/or the angular velocity sensor 90) provided in the main body apparatus 2 and updates the acceleration data Dc and/or the angular velocity data Db (step S103), and the processing proceeds to the next step.

Next, the processor 81 calculates the orientations of the main body apparatus 2 and the left controller 3 and/or the right controller 4 (step S104), and the processing proceeds to the next step. For example, using angular velocity data stored in the angular velocity data Db, the processor 81 acquires the angular velocities about the xyz axes of the main body apparatus 2. Then, in accordance with the acquired angular velocities, the processor 81 rotates the xyz axes in the orientation of the main body apparatus 2 indicated by the orientation data Dd and updates data indicating the orientation of the main body apparatus 2 in the orientation data Dd, using the directions of the rotated xyz axes. Using angular velocity data detected by the angular velocity sensors 105 and/or 115 of the left controller 3 and/or the right controller 4 and stored in the operation data Da, the processor 81 acquires the angular velocities about the xyz axes of the left controller 3 and/or the right controller 4. Then, in accordance with the acquired angular velocities, the processor 81 rotates the xyz axes in the orientations of the left controller 3 and/or the right controller 4 indicated by the orientation data Dd and updates data indicating the orientations of the left controller 3 and/or the right controller 4 in the orientation data Dd, using the directions of the rotated xyz axes.

Next, the processor 81 sets the virtual camera (step S105), and the processing proceeds to the next step. For example, similarly to a change in the orientation of the main body apparatus 2 in real space calculated in the above step S104, the processor 81 changes the orientation of the virtual camera in the virtual space and updates the virtual camera data Di using the changed orientation of the virtual camera. The change in the orientation of the virtual camera may be calculated by rotating up, down, left, right, front, and back axes of the virtual camera based on angular velocities generated about the xyz axes of the main body apparatus 2.

Next, the processor 81 calculates a pointed position pointed at by the left controller 3 and/or the right controller 4 (step S106), and the processing proceeds to the next step. For example, based on data indicating the orientation of the main body apparatus 2 and the orientations of the left controller 3 and/or the right controller 4 indicated by the orientation data Dd, the processor 81 calculates as the pointed position a position on the display 12 pointed at by the left controller 3 and/or the right controller 4. As an example, the processor 81 calculates as the pointed position the position where the longitudinal direction of the left controller 3 and/or the right controller 4 (the positive y-axis direction shown in FIG. 1) and the display 12 of the main body apparatus 2 intersect each other. However, a position outside the display 12 can also be calculated. In the exemplary embodiment, as an example of a first user input, a pointed position pointed by the operation of pointing at the position using the left controller 3 and/or the right controller 4 is used.

The pointed position may be calculated based on only the orientation of the main body apparatus 2, or may be calculated based on only the orientations of the left controller 3 and/or the right controller 4. For example, in the first case, a position in the virtual space overlapping a predetermined position (e.g., a center position) in the display 12 is set as the pointed position. In this case, the orientation of the virtual camera for setting the range of the virtual space to be displayed on the display 12 can be changed by changing the orientation of the main body apparatus 2. Thus, as a result, the position in the virtual space overlapping the predetermined position in the display 12, i.e., the pointed position, can be changed by changing the orientation of the main body apparatus 2. For example, in the second case, when a display device (e.g., the main body apparatus 2) fixed in real space is used, the pointed position can be calculated based on only the orientations of the left controller 3 and/or the right controller 4.

Next, the processor 81 performs an object movement process (step S107), and the processing proceeds to step S108. With reference to FIG. 18, a description is given below of the object movement process performed in the above step S107.

In FIG. 18, the processor 81 determines whether or not the operation of determining an operation target is performed (step S111). For example, with reference to the operation data Da, when the operation of selecting an operation target from the plurality of objects and determining the operation target (e.g., the operation of starting pressing the operation button (A-button) 53 of the right controller 4 or the operation of starting pressing the operation button (R-button) 60) is performed, the determination of the processor 81 is affirmative in the above step S111. Then, when the operation of determining an operation target is performed, the processing proceeds to step S112. On the other hand, when the operation of determining an operation target is not performed, the processing proceeds to step S114.

In step S112, the processor 81 performs the process of determining an operation target, and the processing proceeds to the next step. For example, based on a virtual space image displayed on the display 12 in an image generation/display/control process in step S108 described below, the processor 81 determines as an operation target an object displayed in a superimposed manner on the pointed position (the position where the indicator T is displayed) and updates the operation target data De using data indicating the object. When an object is not displayed in a superimposed manner on the pointed position (the position where the indicator T is displayed), the processor 81 determines that an operation target is not set. Then, the processing proceeds to the next step.

Next, the processor 81 sets the movement flag to on, and the processing proceeds to step S114. For example, the processor 81 sets the movement flag to on and updates the movement flag data Df. When an operation target is not set in the above step S112, the processor 81 maintains the off state of the movement flag.

In step S114, with reference to the movement flag data Df, the processor 81 determines whether or not the movement flag is set to on. Then, when the movement flag is set to on, the processing proceeds to step S115. On the other hand, when the movement flag is set to off, the processing of this subroutine ends.

In step S115, based on the position of the object set as the movement target, the processor 81 sets a movable surface in the virtual space, and the processing proceeds to the next step. For example, using the movement target data De and the object data Dh, the processor 81 acquires the position coordinates in the XYZ axis coordinate system of the object set as the movement target, and based on the position coordinates, sets a movable surface MS for moving the object, thereby updating the movable surface data Dg. The definition method for defining the movable surface MS is similar to the method described with reference to FIGS. 9 to 15, and therefore is not described in detail here.

Next, the processor 81 determines whether or not the operation of moving the object as the operation target in up, down, left, and right directions is performed (step S116). For example, when the operation of moving the pointed position calculated in the above step S106 in up, down, left, and right directions is performed, the determination of the processor 81 is affirmative in the above step S116. Then, when the operation of moving the object in the up, down, left, and right directions is performed, the processing proceeds to step S117. On the other hand, when the operation of moving the object in the up, down, left, and right directions is not performed, the processing proceeds to step S118. In the exemplary embodiment, as an example of a first user input, the operation of moving an object in up, down, left, and right directions is used.

In step S117, in accordance with the operation of moving the object in the up, down, left, and right directions, the processor 81 moves the object as the operation target along the movable surface, and the processing proceeds to step S118. For example, the processor 81 selects a component surface on which the object as the operation target is placed, among the component surfaces of the movable surface MS indicated by the movable surface data Dg, and calculates a position in the component surface displayed in a superimposed manner on the pointed position calculated in the above step S106. Then, the processor 81 moves the object as the operation target to the calculated position in the component surface in the state where the orientation of the object is maintained, and updates the object data Dh using the position after the movement. When the position superimposed on the pointed position is in another component surface adjacent to the component surface on which the object as the operation target is placed, the processor 81 calculates, as the destination position of the movement of the object, the position in the other component displayed in a superimposed manner on the pointed position. When the pointed position is outside the display 12, the processor 81 may calculate the position of the movement destination of the object using, as an indicated position for calculating the movement destination of the object, a position on the pointed position side where a straight line connecting the pointed position and the position of the object as the operation target (the position of the center of gravity) or the center of the display 12 intersects the outer edge of the display 12.

In step S118, the processor 81 determines whether or not the operation of moving the object as the operation target in a depth direction is performed. For example, with reference to the operation data Da, when the operation of moving the operation target by distancing the operation target from or bringing the operation target close to the virtual camera (e.g., the operation of tilting the stick 52 of the right controller 4 in the front and back directions), the determination of the processor 81 is affirmative in the above step S118. Then, when the operation of moving the object in the depth direction is performed, the processing proceeds to step S119. On the other hand, when the operation of moving the object in the depth direction is not performed, the processing proceeds to step S120. In the exemplary embodiment, as an example of a second user input, the operation of moving an object in a depth direction is used.

In step S119, in accordance with the operation of moving the object as the operation target in the depth direction, the processor 81 moves the object as the operation target by distancing the object from or bringing the object close to the virtual camera, and the processing proceeds to step S120. For example, when the operation data Da indicates that the operation of tilting the stick 52 of the right controller 4 in a front direction is performed, the processor 81 moves the object as the operation target to a position away from the virtual camera by a moving distance corresponding to the tilt angle and updates the object data Dh using the position after the movement. When the operation data Da indicates that the operation of tilting the stick 52 of the right controller 4 in a back direction is performed, the processor 81 moves the object as the operation target to a position toward the virtual camera by a moving distance corresponding to the tilt angle and updates the object data Dh using the position after the movement.

In step S120, the processor 81 determines whether or not the operation of cancelling the operation target is performed. For example, with reference to the operation data Da, when the operation of cancelling the operation target (e.g., the operation of finishing pressing the operation button (A-button) 53 of the right controller 4 or the operation of finishing pressing the operation button (R-button) 60) is performed, the determination of the processor 81 is affirmative in the above step S120. Then, when the operation of cancelling the operation target is performed, the processing proceeds to step S121. On the other hand, when the operation of cancelling the operation target is not performed, the processing of this subroutine ends.

In step S121, the processor 81 performs the process of cancelling the operation target, and the processing proceeds to the next step. For example, to cancel the operation target specifying of the object set as the operation target, the processor 81 updates the operation target data De using data indicating that the operation target is not set (e.g., null).

Next, the processor 81 sets the movement flag to off, and the processing of this subroutine ends. For example, the processor 81 sets the movement flag to off, thereby updating the movement flag data Df.

Referring back to FIG. 17, after the object movement process in the above step S107, the processor 81 performs an image generation/display/control process (step S108), and the processing proceeds to the next step. For example, based on the object data Dh, the processor 81 places the plurality of objects in the virtual space, thereby generating the virtual space. When the movement flag indicated by the movement flag data Df is set to on (when the process of moving the object is performed), with reference to the operation target data De and the movable surface data Dg, the processor 81 places a visible grid Gms1 on the component surface on which the object as the operation target is placed, among the component surfaces of the movable surface MS defined in the virtual space. When the movement flag indicated by the movement flag data Df is set to off (when the process of moving the object is not performed), the processor 81 places the indicator T at the pointed position calculated in the above step S106. Then, based on the virtual camera data Di, the processor 81 places the virtual camera in the virtual space, acquires a virtual space image viewed from the virtual camera, and displays the virtual space image on the display 12. The indicator T may be superimposed on and combined with the virtual space image in which the virtual space where the plurality of objects are placed is viewed from the virtual camera.

Next, the processor 81 determines whether or not the processing is to be ended (step S109). Examples of a condition for ending the processing in the above step S109 include the fact that a condition for ending the processing is satisfied, the fact that the user performs the operation of ending the processing, and the like. When the processing is not to be ended, the processing returns to the above step S102, and the process of step S102 is repeated. When the processing is to be ended, the processing of the flow chart ends. Hereinafter, the series of processes of steps S102 to S109 is repeatedly executed until it is determined in step S109 that the processing is to be ended.

As described above, in the exemplary embodiment, when an object is moved in up, down, left, and right directions in a virtual space, the object can be moved along a movable surface including a plurality of component surfaces at a predetermined angle (e.g., 90°) to each other in a portion where the component surfaces intersect each other. Thus, it is possible to prevent the object from moving to a position shifted from the intention of a user. Thus, it is possible to move and place the object in the virtual space as intended by the user.

Further, in the above exemplary embodiment, a method for detecting the orientations of the main body apparatus 2, the left controller 3, and the right controller 4 is a mere example. Alternatively, the orientations of the main body apparatus 2, the left controller 3, and the right controller 4 may be detected using another method or another piece of data. Further, a controller for performing the operation of moving an object may be not only the left controller 3 or the right controller 4, but also another controller.

Further, the game system 1 may be any apparatus, and may be a mobile game apparatus, any mobile electronic device (a PDA (Personal Digital Assistant), a mobile phone, a personal computer, a camera, a tablet, or the like. In this case, an input device for performing the operation of moving an object may not be the left controller 3 or the right controller 4, and may be another controller, a mouse, a touch pad, a touch panel, a trackball, a keyboard, a directional pad, a slide pad, or the like.

Further, the above descriptions have been given using an example where the game system 1 performs information processing and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may move in conjunction with to perform the processing steps. Another apparatus may thus perform at least some of the processing steps, thereby enabling processing similar to that described above. Further, the above information processing can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing program, an information processing apparatus, an information processing system, an information processing method, and the like that are capable of moving and placing an object in a virtual space as intended by a user.

What is claimed is:

1. A non-transitory computer-readable storage medium having stored therein an information processing program executed by a computer of an information processing apparatus for placing or moving an object in a three-dimensional virtual space, the information processing program causing the computer to provide execution comprising:

placing a plurality of objects at respective positions in the three-dimensional virtual space;

placing a virtual camera for acquiring an image of the three-dimensional virtual space in the three-dimensional virtual space;

for each of the plurality of objects, defining a movable surface including at least a first surface in the three-dimensional virtual space and a second surface at a predetermined angle to the first surface in a portion where the second surface intersects the first surface; and based on a first user input, moving the object along the movable surface defined for the object, wherein when the object moves along the movable surface in a first direction, the movable surface is defined based on a position of the object after movement in the first direction and defined based on an orientation of the virtual camera in the three-dimensional virtual space.

2. The non-transitory computer-readable storage medium having stored therein the information processing program according to claim 1, wherein even when an orientation of the virtual camera is changed in the three-dimensional virtual space, the movable surface is defined by fixing a position of the movable surface.

3. The non-transitory computer-readable storage medium having stored therein the information processing program according to claim 1, wherein a plurality of movable surfaces placed in a laminated manner are defined, and based on a second user input, the object is moved from a movable surface of the object including a position of the object among the plurality of movable surfaces to a movable surface different from the movable surface among the plurality of movable surfaces.

4. The non-transitory computer-readable storage medium having stored therein the information processing program according to claim 1, wherein based on a second user input, the object is moved to a position other than the movable surface defined in association with the object, and when the object moves based on the second user input, the movable surface of the object is defined based on the position of the object after the movement.

5. The non-transitory computer-readable storage medium having stored therein the information processing program according to claim 1, wherein when the object shifts from a movement along the first surface to a movement along the second surface, the object is moved while an orientation of the object is held in the three-dimensional virtual space.

6. The non-transitory computer-readable storage medium having stored therein the information processing program according to claim 1, wherein the information processing program further causing the computer to provide execution comprising acquiring an orientation of a goggle apparatus attached to a position where the goggle apparatus covers at least an eye of a user and including a display screen configured to display an image of the three-dimensional virtual space viewed from the virtual camera so that the user can view the image, wherein the virtual camera is controlled based on the orientation of the goggle apparatus.

7. The non-transitory computer-readable storage medium having stored therein the information processing program according to claim 1, wherein the information processing program further causing the computer to provide execution comprising:
  displaying on a display device an image of the three-dimensional virtual space viewed from the virtual camera; and
  acquiring an orientation of the display device, wherein
  the virtual camera is controlled based on the orientation of the display device.

8. The non-transitory computer-readable storage medium having stored therein the information processing program according to claim 1, wherein
  the object is moved based on an angular velocity included in the first user input.

9. The non-transitory computer-readable storage medium having stored therein the information processing program according to claim 1, wherein
  each of the first surface and the second surface is a flat surface.

10. The non-transitory computer-readable storage medium having stored therein the information processing program according to claim 1, wherein
  the first surface and the second surface orthogonally intersect each other in the portion where the first surface and the second surface intersect each other.

11. The non-transitory computer-readable storage medium having stored therein the information processing program according to claim 1, wherein
  among a plurality of surfaces forming the movable surface, a surface including a position of the object to be moved based on the first user input is displayed in a display form different from a display form of another surface.

12. An information processing apparatus for placing or moving an object in a three-dimensional virtual space, the information processing apparatus comprising:
  a processor; and
  a memory configured to store computer readable instructions that, when executed by the processor, cause the information processing apparatus to:
    place a plurality of objects at respective positions in the three-dimensional virtual space;
    place a virtual camera for acquiring an image of the three-dimensional virtual space in the three-dimensional virtual space;
    for each of the plurality of objects, define a movable surface including at least a first surface in the three-dimensional virtual space and a second surface at a predetermined angle to the first surface in a portion where the second surface intersects the first surface; and
    based on a first user input, move the object along the movable surface defined for the object, wherein
  when the object moves along the movable surface in a first direction, the movable surface is defined based on a position of the object after movement in the first direction and defined based on an orientation of the virtual camera in the three-dimensional virtual space.

13. The information processing apparatus according to claim 12, wherein
  the information processing apparatus is configured to communicate with an operation device,
  the operation device includes a gyro sensor configured to detect an angular velocity generated in the operation device, and
  the object is moved using as the first user input the angular velocity detected by the gyro sensor.

14. An information processing system for placing or moving an object in a three-dimensional virtual space, the information processing system comprising:
  a display device; and
  processing circuitry including at least one processor, the processing circuitry configured to:
    place a plurality of objects at respective positions in the three-dimensional virtual space;
    place a virtual camera for acquiring an image of the three-dimensional virtual space in the three-dimensional virtual space;
    for each of the plurality of objects, define a movable surface including at least a first surface in the three-dimensional virtual space and a second surface at a predetermined angle to the first surface in a portion where the second surface intersects the first surface; and
    based on a first user input, move the object along the movable surface defined for the object, wherein
  when the object moves along the movable surface in a first direction, the movable surface is defined based on a position of the object after movement in the first direction and defined based on an orientation of the virtual camera in the three-dimensional virtual space.

15. An information processing method for placing or moving an object in a three-dimensional virtual space, the information processing method comprising:
  placing a plurality of objects at respective positions in the three-dimensional virtual space;
  placing a virtual camera for acquiring an image of the three-dimensional virtual space in the three-dimensional virtual space;
  for each of the plurality of objects, defining a movable surface including at least a first surface in the three-dimensional virtual space and a second surface at a predetermined angle to the first surface in a portion where the second surface intersects the first surface; and
  based on a first user input, moving the object along the movable surface defined for the object, wherein
  when the object moves along the movable surface in a first direction, the movable surface is defined based on a position of the object after movement in the first direction and defined based on an orientation of the virtual camera in the three-dimensional virtual space.

16. The non-transitory computer-readable storage medium having stored therein the information processing program according to claim 1, wherein
  the first direction is a depth direction, and the object moves in the depth direction based on a depth movement operation.

17. The non-transitory computer-readable storage medium having stored therein the information processing program according to claim 1, wherein
  the movable surface is reset based on the position of the object after the movement in the first direction, and the movable surface exists on a cuboid shaped object.

18. The non-transitory computer-readable storage medium having stored therein the information processing program according to claim 1, wherein the movable surface is defined based on position coordinates of the object in a screen coordinate system based on the orientation of the virtual camera.

19. The non-transitory computer-readable storage medium having stored therein the information processing program according to claim 1, wherein the object is moved without being distanced from the movable surface.

20. The non-transitory computer-readable storage medium having stored therein the information processing program according to claim 1, wherein the object is configured to move to any position of the movable surface.

* * * * *